(12) United States Patent
Uchimura

(10) Patent No.: US 10,750,149 B2
(45) Date of Patent: Aug. 18, 2020

(54) INFORMATION PROCESSING APPARATUS, INFORMATION RECORDING MEDIUM, INFORMATION PROCESSING METHOD, AND PROGRAM

(71) Applicant: SONY CORPORATION, Tokyo (JP)

(72) Inventor: Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/780,315

(22) PCT Filed: Feb. 27, 2017

(86) PCT No.: PCT/JP2017/007465
§ 371 (c)(1),
(2) Date: May 31, 2018

(87) PCT Pub. No.: WO2017/159313
PCT Pub. Date: Sep. 21, 2017

(65) Prior Publication Data
US 2018/0352206 A1 Dec. 6, 2018

(30) Foreign Application Priority Data
Mar. 17, 2016 (JP) ................... 2016-053264

(51) Int. Cl.
*H04N 9/87* (2006.01)
*G11B 27/32* (2006.01)
(Continued)

(52) U.S. Cl.
CPC .......... *H04N 9/8715* (2013.01); *G11B 20/10* (2013.01); *G11B 27/10* (2013.01); *G11B 27/322* (2013.01);
(Continued)

(58) Field of Classification Search
CPC .................. H04N 9/8715; H04N 5/44504
See application file for complete search history.

(56) References Cited

U.S. PATENT DOCUMENTS

2018/0191997 A1* 7/2018 Oh .................... H04N 21/235

FOREIGN PATENT DOCUMENTS

| JP | 2011-023071 A | 2/2011 |
|----|---------------|--------|
| JP | 2012-169885 A | 9/2012 |

(Continued)

OTHER PUBLICATIONS

Jun. 30, 2020, Japanese Office Action issued for related JP application No. 2016-053264.

*Primary Examiner* — Girumsew Wendmagegn
(74) *Attorney, Agent, or Firm* — Paratus Law Group, PLLC

(57) ABSTRACT

Provided is an information processing apparatus including: a data processing unit configured to execute a data reproduction process. The data processing unit includes a decode unit that decodes reproduction control information of subtitle data included in reproduction target data, and the decode unit acquires color space designation information, electro-optical transfer function (EOTF) designation information, and color depth designation information that are recorded in subtitle data reproduction control information, and generates output subtitle data in accordance with acquired information.

19 Claims, 24 Drawing Sheets

(51) Int. Cl.
    *G11B 27/10*     (2006.01)
    *G11B 20/10*     (2006.01)
    *H04N 5/445*     (2011.01)

(52) U.S. Cl.
    CPC . *H04N 5/44504* (2013.01); *G11B 2220/2541* (2013.01)

(56) References Cited

FOREIGN PATENT DOCUMENTS

| | | |
|---|---|---|
| WO | WO 2015/007910 A1 | 1/2015 |
| WO | WO 2016/017961 A1 | 2/2016 |

\* cited by examiner

[Fig. 1]
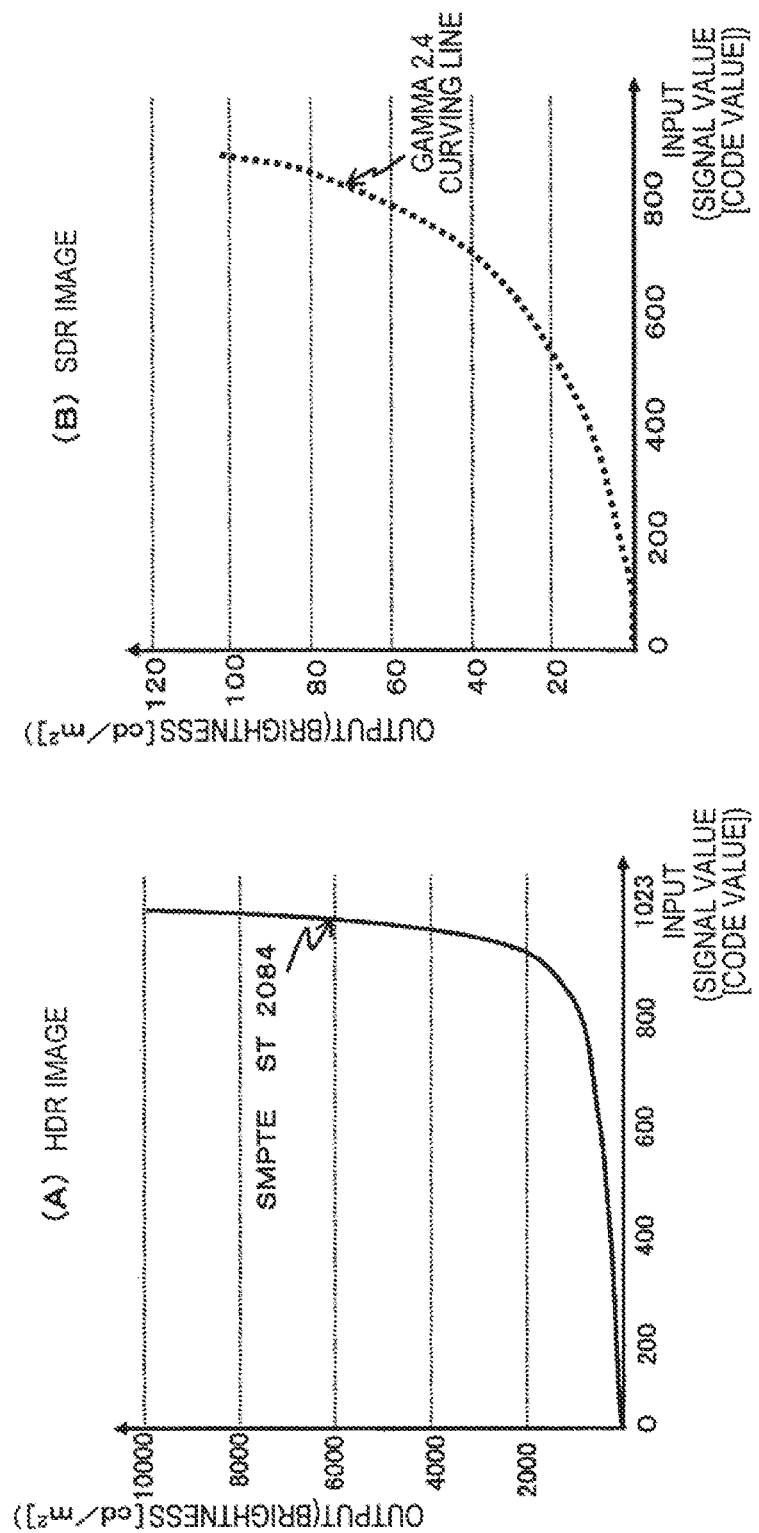

[Fig. 2]
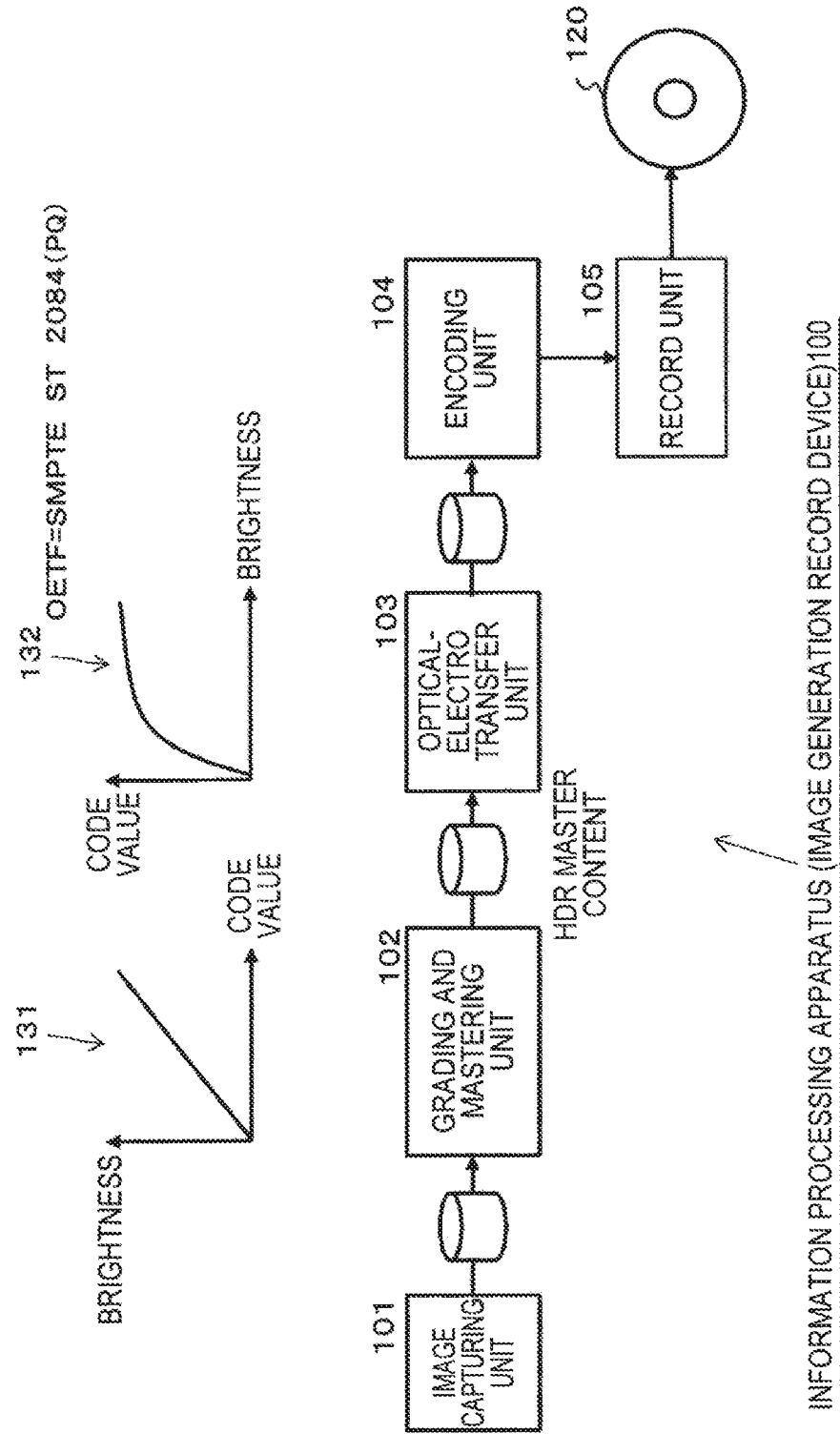

[Fig. 3]
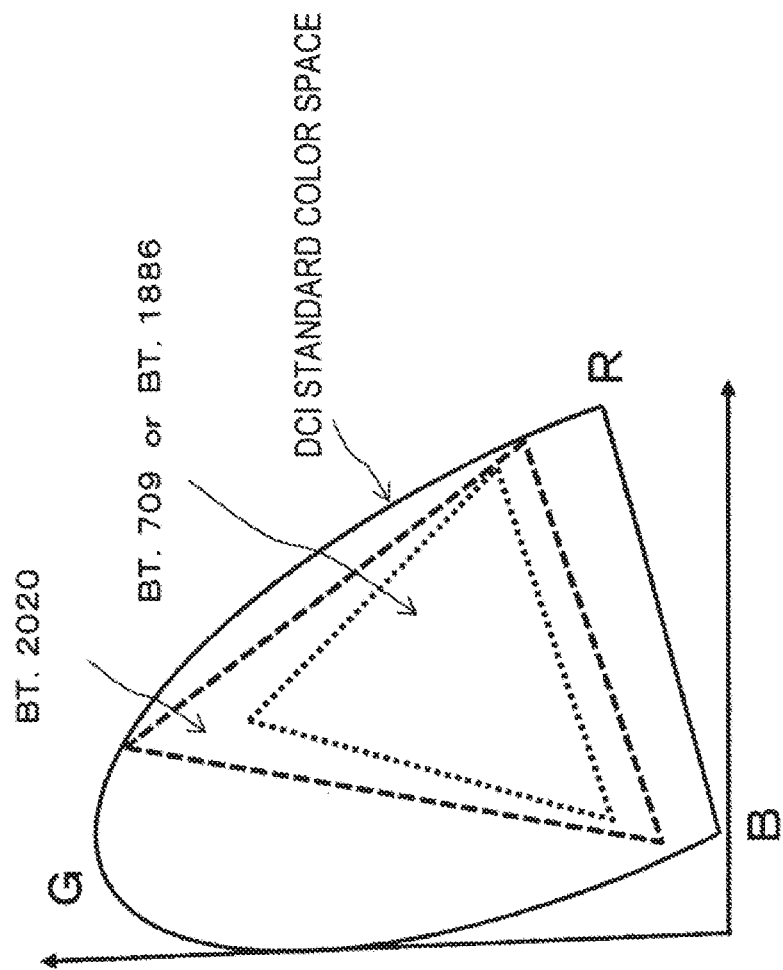

[Fig. 4]
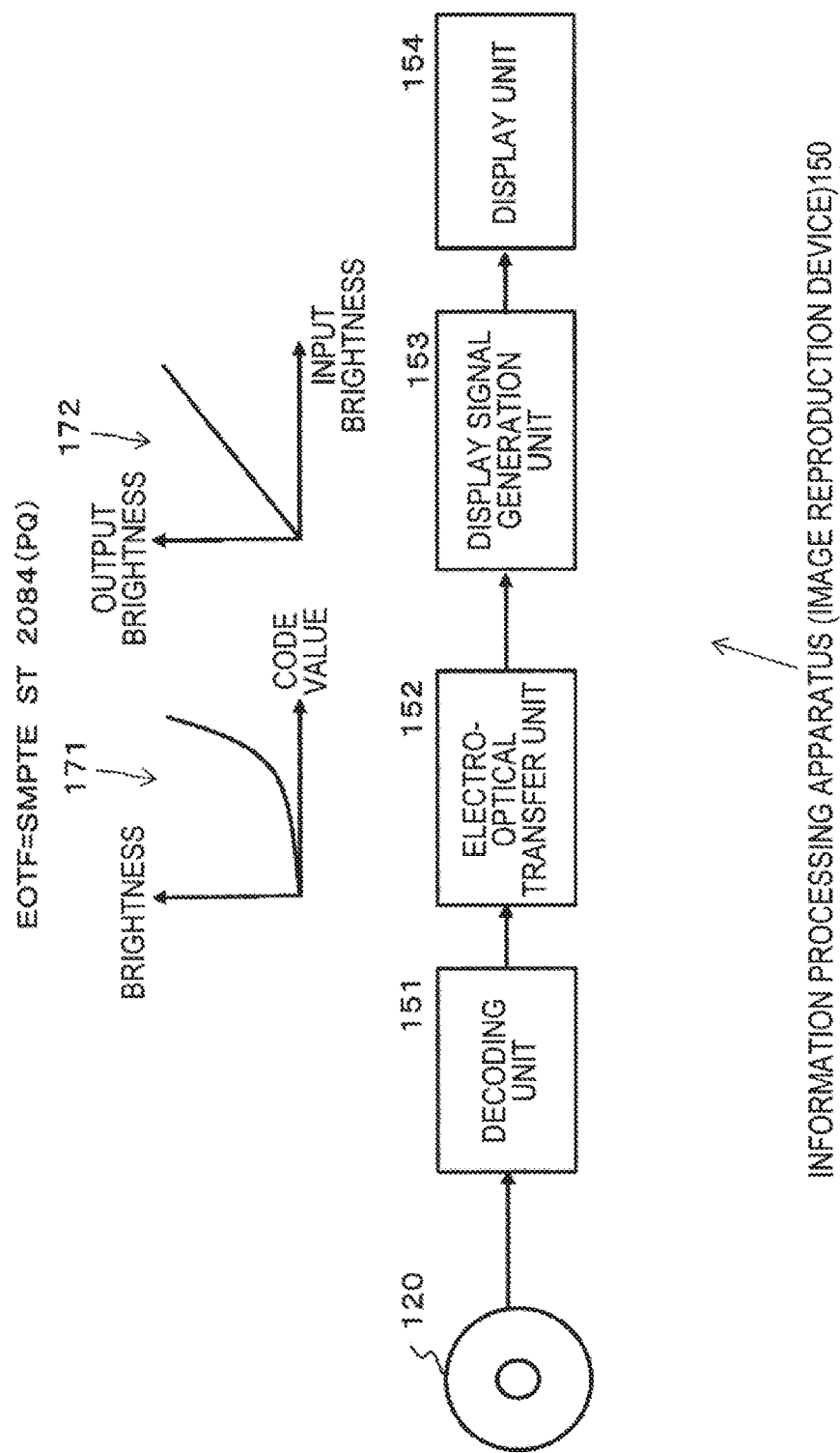

[Fig. 5]
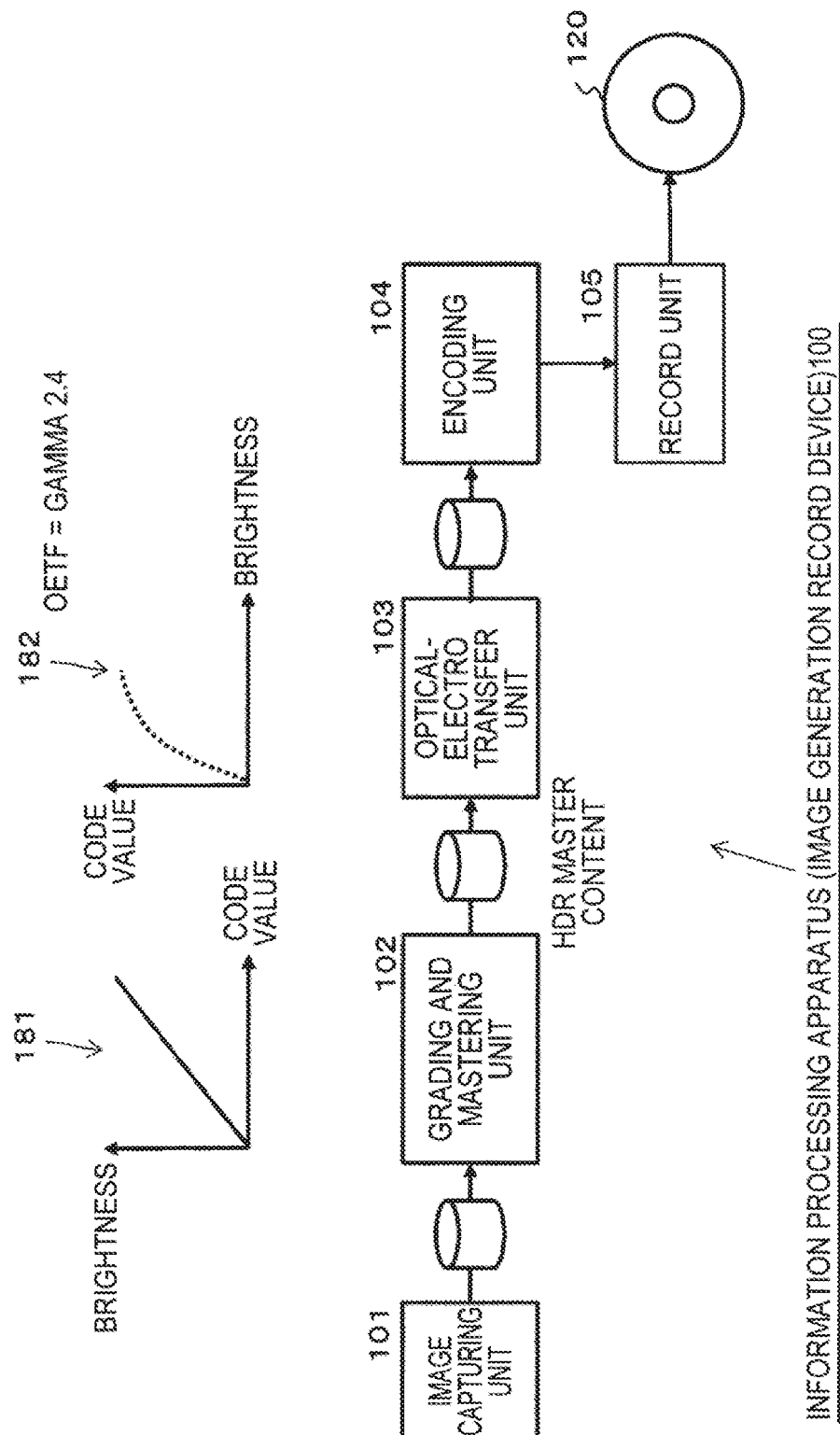

[Fig. 6]
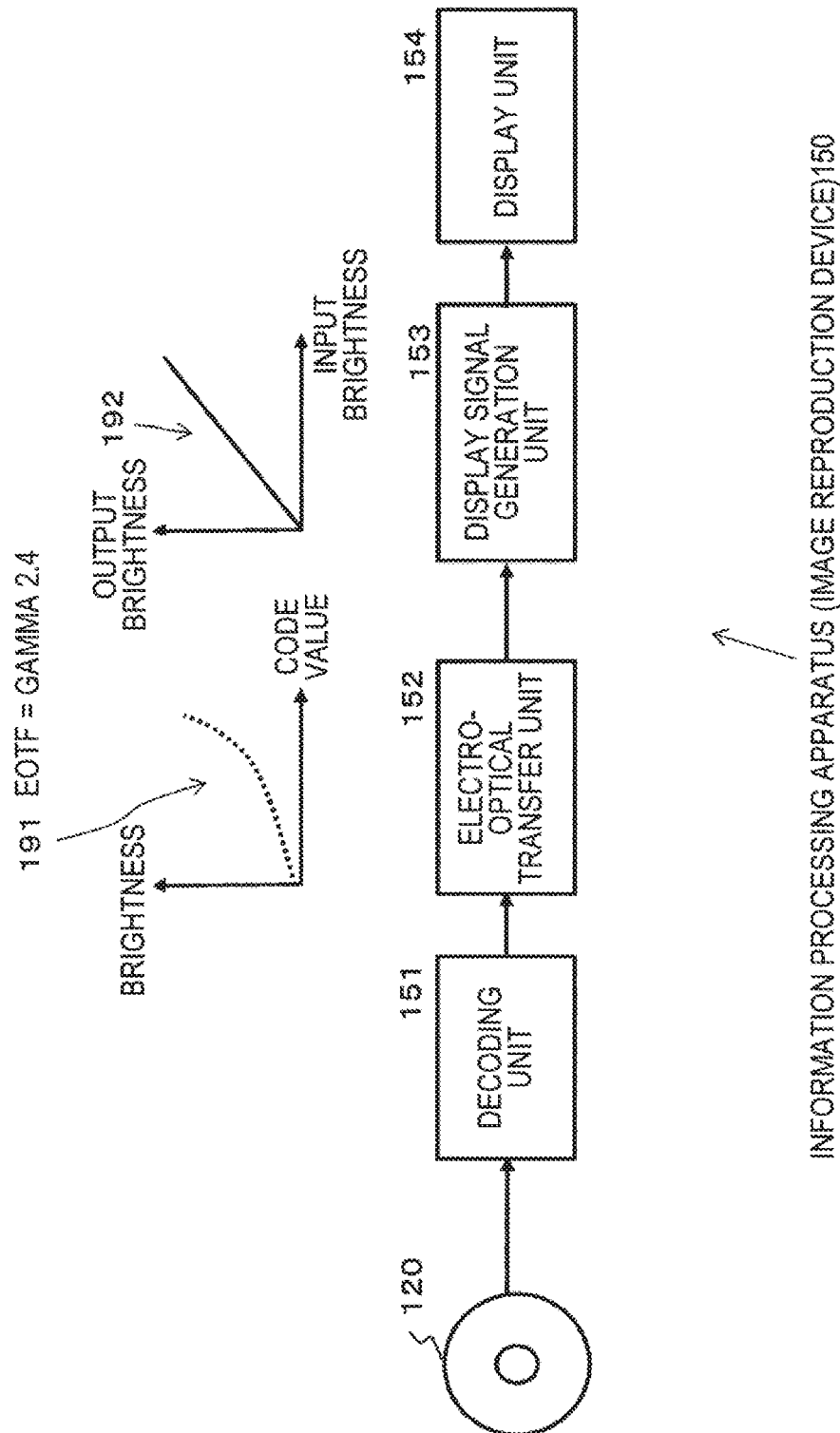

[Fig. 7]
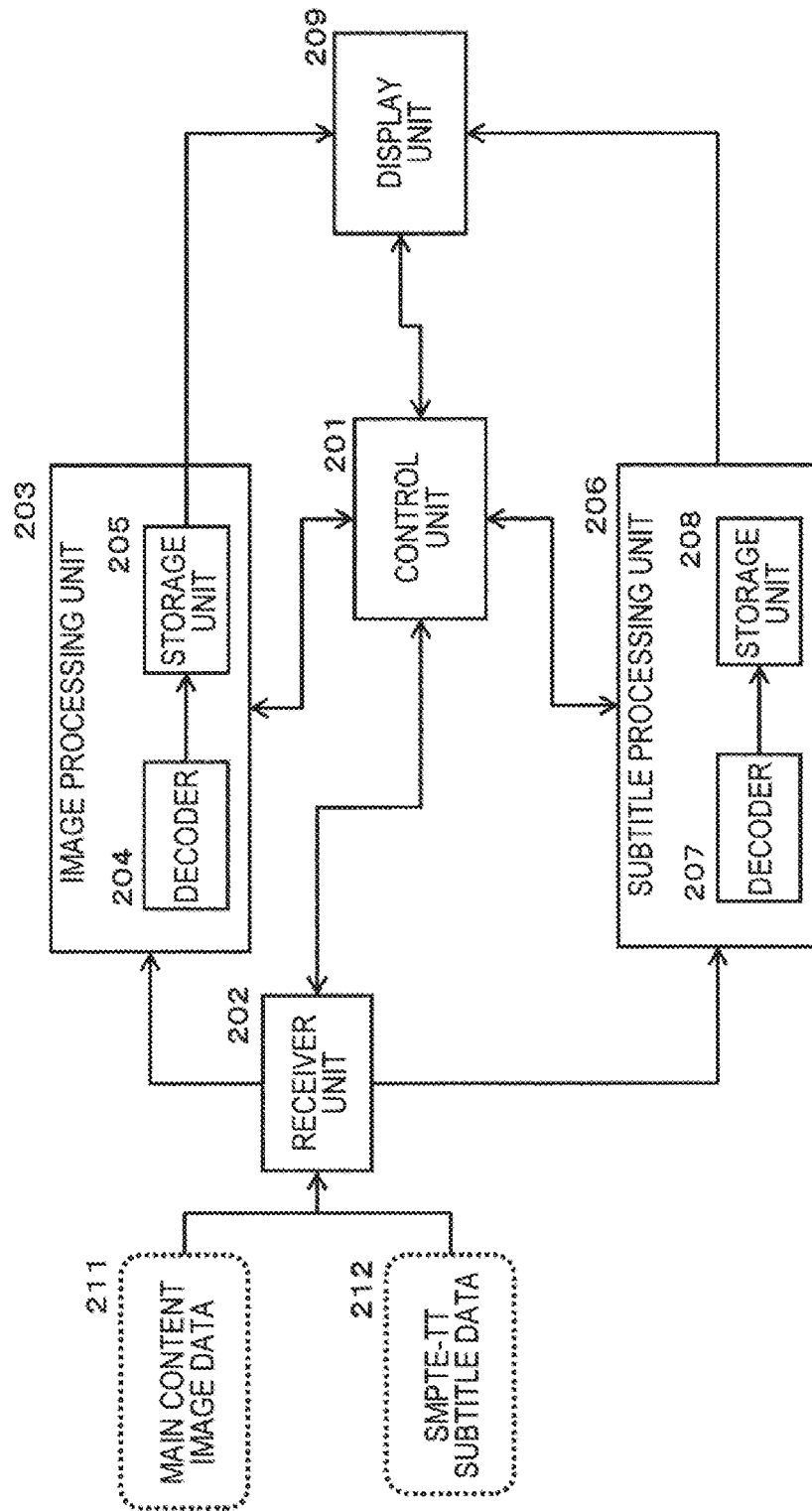

[Fig. 8]
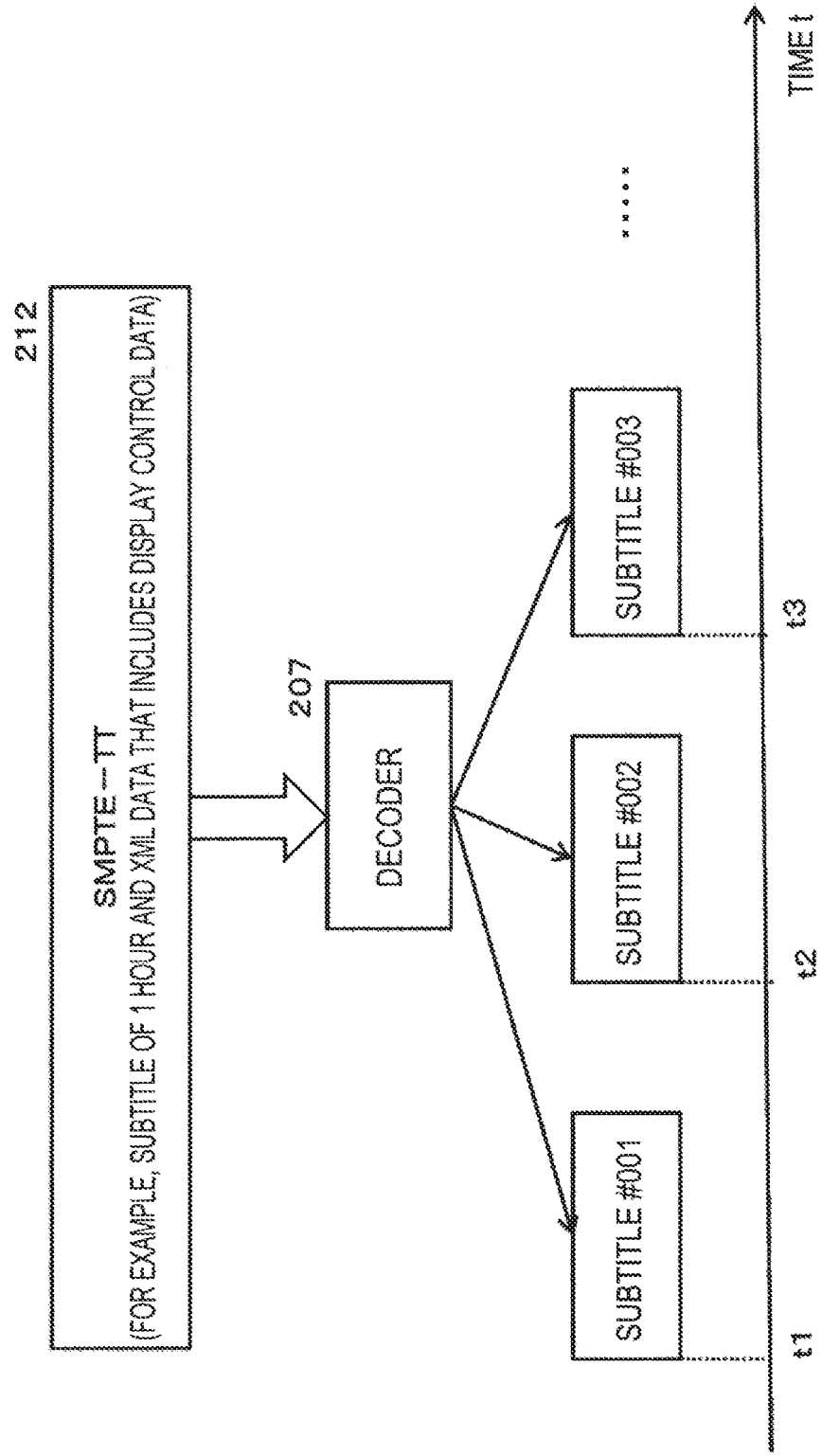

[Fig. 9]

```
<tt
 xmlns="http://www.w3.org/ns/ttml"
 xmlns:tts="http://www.w3.org/ns/ttml#styling"
 xmlns:ttm="http://www.w3.org/ns/ttml#metadata"
 xmlns:ttp="http://www.w3.org/ns/ttml#parameter"
 xmlns:xsi="http://www.w3.org/2001/XMLSchema-instance"
 xmlns:smpte="http://www.smpte-ra.org/schemas/2052-1/2010/smpte-tt"
 xmlns:cff="http://www.decellc.org/schema/2012/01/cff-tt-meta"
 xml:lang="ja" ttp:profile="http://www.decellc.org/profile/2012/01/cff-tt"
 ttp:frameRate="24" ttp:frameRateMultiplier="1000 1001"   ··· FRAME RATE INFORMATION
 tts:extent="1920px 1080px">   ··· PICTURE FRAME INFORMATION
 <head>
  <layout>
   <region xml:id="imageRegion" tts:origin="640px 900px" tts:extent="640px 32px"/>   ··· SUBTITLE LAYOUT INFORMATION
  </layout>
 </head>
 <body>
  <div
   region="imageRegion"
   begin="00:00:00:00"   ··· SUBTITLE DISPLAY START TIME INFORMATION
   end="00:00:05:00"   ··· SUBTITLE DISPLAY END TIME INFORMATION
   smpte:backgroundImage="urn:dece:container:subtitle:imageindex:1.png"/>   ··· DISPLAYED SUBTITLE DATA (PNG) DESIGNATION INFORMATION
 </body>
</tt>
```

[Fig. 10]

```
<tt
xmlns="http://www.w3.org/ns/ttm"
xmlns:tts=http://www.w3.org/ns/ttml#styling
xmlns:ttm="http://www.w3.org/ns/ttml#metadata"
xmlns:ttp=http://www.w3.org/ns/ttml#parameter
xmlns:xsi="http://www.w3.org/2001/XMLSchema-instance"
xmlns:smpte="http://www.smpte-ra.org/schemas/2052-1/2010/smpte-tt"
xmlns:cff="http://www.decelic.org/schema/2012/01/cff-tt-meta"
xml:lang="ja" ttp:profile="http://www.decelic.org/profile/2012/01/cff-tt"
ttp:frameRate="24" ttp:frameRateMultiplier="1000 1001" ← FRAME RATE INFORMATION
tts:extent="1920px 1080px"> ← PICTURE FRAME INFORMATION
<head>
    <layout>
        <region xml:id="imageRegion" tts:origin="640px 900px" tts:extent="640px 32px"/> ← SUBTITLE LAYOUT INFORMATION
    </layout>
</head>
<body>
    <div>
        <p
        region="imageRegion"
        begin="00:00:00:00" ← SUBTITLE DISPLAY START TIME INFORMATION
        end="00:00:05:00" > ← SUBTITLE DISPLAY END TIME INFORMATION
        <span tts:color="red"/>
        TEXT ← DISPLAYED SUBTITLE DATA (TEXT) INFORMATION
        </span>
        </p>
    </div>
</body>
</tt>
```

[Fig. 11]
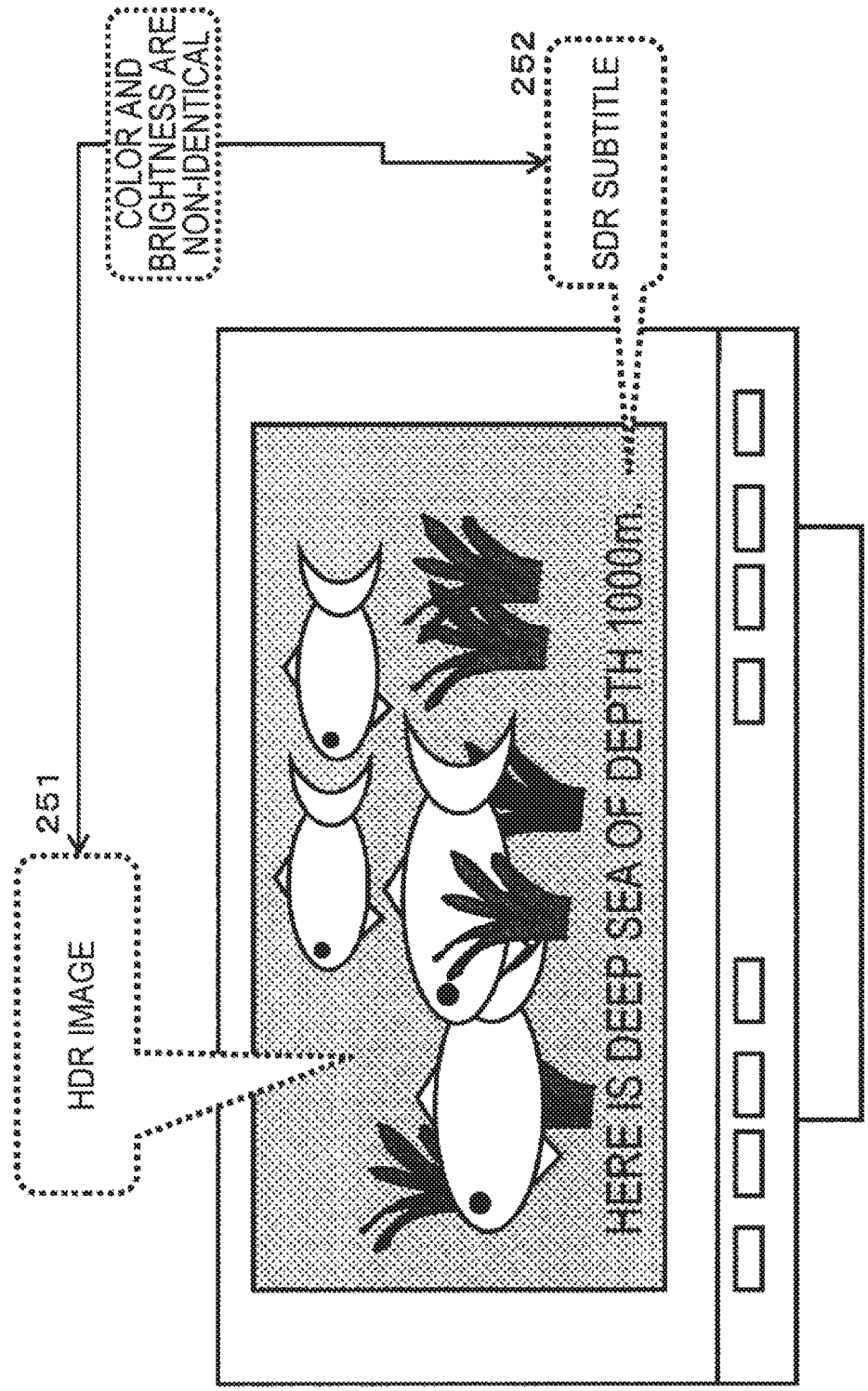

[Fig. 12]
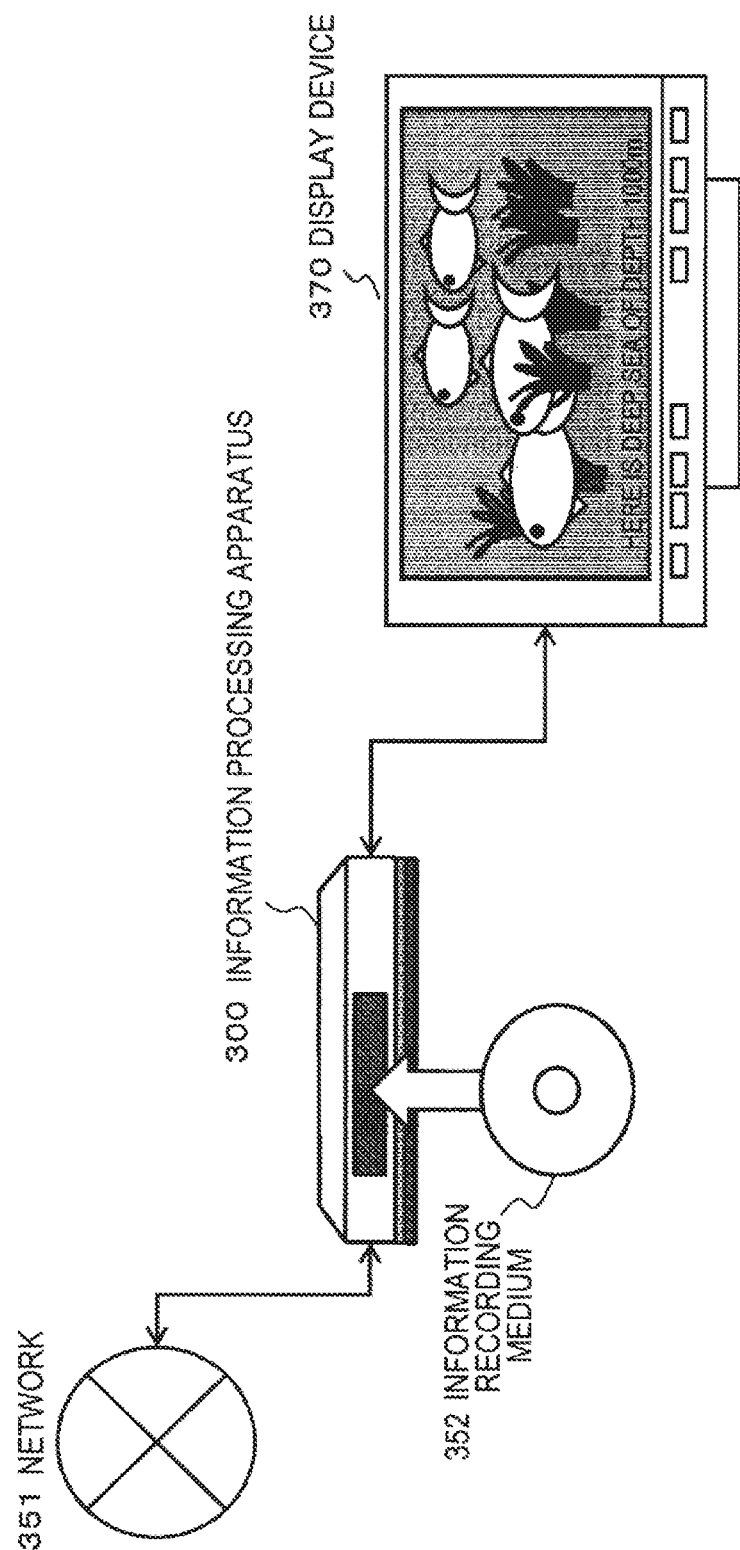

[Fig. 13]
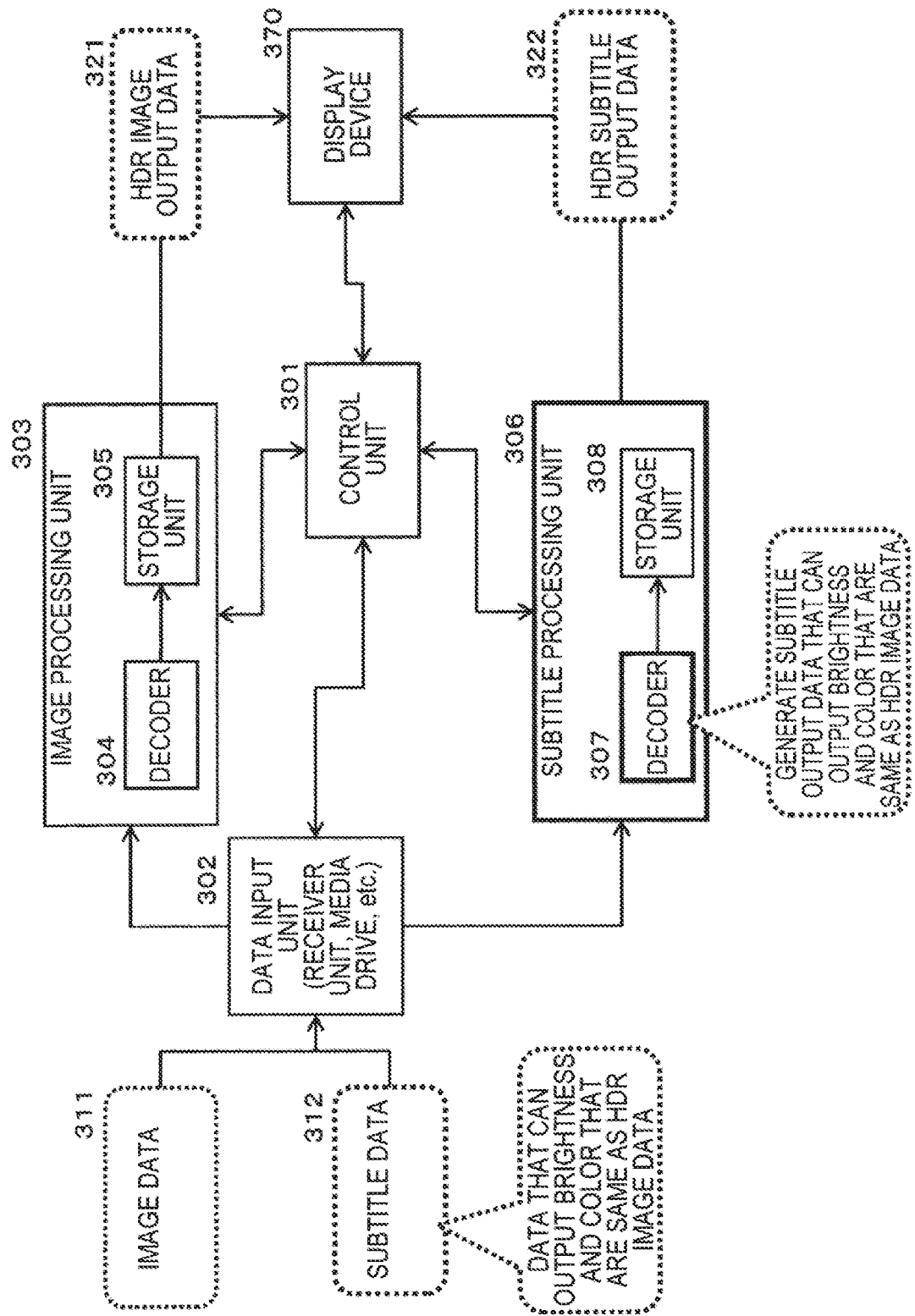

[Fig. 14]

| (a) ATTRIBUTE DEFINITION | (b) XML DATA ATTRIBUTE SCRIPT FIELD | (c) XML DATA ATTRIBUTE SCRIPT EXAMPLE | (d) MEANING |
|---|---|---|---|
| (1) COLOR SPACE DESIGNATION INFORMATION (attribute =String) | tts:colorSpace | tts:colorSpace="BT.2020" | SUBTITLE DATA IS DATA THAT IS GENERATED IN ACCORDANCE WITH COLOR SPACE BT.2020. |
| | | tts:colorDepth="BT.1886" | SUBTITLE DATA IS DATA THAT IS GENERATED IN ACCORDANCE WITH COLOR SPACE BT.1886. |
| | | tts:colorDepth="sRGB" | SUBTITLE DATA IS DATA THAT IS GENERATED IN ACCORDANCE WITH COLOR SPACE sRGB. |
| (2) EOTF DESIGNATION INFORMATION (attribute =String) | tts:EOTF | tts:EOTF="SMPTEST2084" | EOTF APPLIED TO SUBTITLE DATA IS SMPTE ST 2084. |
| | | tts:EOTF="γ2.4" | EOTF APPLIED TO SUBTITLE DATA IS GAMMA 2.4. |
| | | tts:EOTF="HDR" | EOTF APPLIED TO SUBTITLE DATA IS HDR COMPATIBLE EOTF. |
| | | tts:EOTF="SDR" | EOTF APPLIED TO SUBTITLE DATA IS SDR COMPATIBLE EOTF. |
| (3) COLOR DEPTH DESIGNATION INFORMATION (VARIABLE) (attribute =uint) | tts:colorDepth | tts:colorDepth="12" | COLOR EXPRESSION BIT VALUE OF SUBTITLE DATA IS 12-BIT DATA. |
| | | tts:colorDepth="10" | COLOR EXPRESSION BIT VALUE OF SUBTITLE DATA IS 10-BIT DATA. |
| | | tts:colorDepth="8" | COLOR EXPRESSION BIT VALUE OF SUBTITLE DATA IS 8-BIT DATA. |

[Fig. 15]

```
<tt
 xmlns="http://www.w3.org/ns/ttml"
 xmlns:tts="http://www.w3.org/ns/ttml#styling"
 xmlns:ttm="http://www.w3.org/ns/ttml#metadata"
 xmlns:ttp="http://www.w3.org/ns/ttml#parameter
 xmlns:xsi="http://www.w3.org/2001/XMLSchema-instance"
 xmlns:smpte="http://www.smpte-ra.org/schemas/2052-1/2010/smpte-tt"
 xmlns:cff="http://www.decelic.org/schema/2012/01/cff-tt-meta"
 xml:lang="ja" ttp:profile="http://www.decelic.org/profile/2012/01/cff-tt"
 ttp:frameRate="24" ttp:frameRateMultiplier="1000 1001"
 tts:extent="1920px 1080px">
<head>
<layout>
<region xml:id="imageRegion" tts:origin="640px 900px" tts:extent="640px 32px"/>
         ┌‥‥‥‥‥‥‥‥‥‥‥┐
         : COLOR SPACE  : 411
         :DESIGNATION INFORMATION:
         └‥‥‥‥‥‥‥‥‥‥‥┘
</layout>
</head>                              ┌‥‥‥‥‥‥‥‥‥‥‥┐
<body>                               :EOTF DESIGNATION: 412
<div tts:colorspace="BT.2020" tts:EOTF="SMPTEST2084">
                                     :  INFORMATION   :
                                     └‥‥‥‥‥‥‥‥‥‥‥┘
<p
 region="imageRegion"
 begin="00:00:00:00"
 end="00:00:05:00" >
<span tts:color="red">
TEXT
</span>
</p>
</div>
</body>
</tt>
```

[Fig. 16]

| (a) ATTRIBUTE | (b) XML DATA ATTRIBUTE SCRIPT FIELD | (c) XML DATA ATTRIBUTE SCRIPT EXAMPLE | (d) MEANING |
|---|---|---|---|
| (3) COLOR DEPTH DESIGNATION INFORMATION (VARIABLE) (attribute =uint) | tts:colorDepth | tts:colorDepth="12" | COLOR EXPRESSION BIT VALUE OF SUBTITLE DATA IS 12-BIT DATA. |
| | | tts:colorDepth="10" | COLOR EXPRESSION BIT VALUE OF SUBTITLE DATA IS 10-BIT DATA. |
| | | tts:colorDepth="8" | COLOR EXPRESSION BIT VALUE OF SUBTITLE DATA IS 8-BIT DATA. |

XML DATA EXAMPLE

```
<body>
<div tts:colorspace="BT.2020" tts:EOTF="SMPTEST2084" tts:ColorDepth="10">
           411                  412                     413
       COLOR SPACE        EOTF DESIGNATION        COLOR DEPTH
   DESIGNATION INFORMATION   INFORMATION      DESIGNATION INFORMATION
<p begin=>
<span tts:color="512, 0, 0">TEXT
                414              415
           COLOR               TEXT
      INFORMATION (10 BITS)  SUBTITLE DATA
</span>
</p>
</div>
</body>
```

[Fig. 17]

| | (a) ATTRIBUTE DEFINITION | (b) XML DATA ATTRIBUTE SCRIPT FIELD | (c) XML DATA ATTRIBUTE SCRIPT EXAMPLE | (d) MEANING |
|---|---|---|---|---|
| (1) | COLOR SPACE DESIGNATION INFORMATION (attribute =String) | tts:colorSpace | tts:colorSpace="BT 2020" | SUBTITLE DATA IS DATA THAT IS GENERATED IN ACCORDANCE WITH COLOR SPACE BT.2020. |
| | | | tts:colorDepth="BT. 1886" | SUBTITLE DATA IS DATA THAT IS GENERATED IN ACCORDANCE WITH COLOR SPACE BT.1886. |
| | | | tts:colorDepth="sRGB" | SUBTITLE DATA IS DATA THAT IS GENERATED IN ACCORDANCE WITH COLOR SPACE sRGB. |
| (2) | EOTF DESIGNATION INFORMATION (attribute =String) | tts:EOTF | tts:EOTF="SMPTEST2084" | EOTF APPLIED TO SUBTITLE DATA IS SMPTE ST 2084. |
| | | | tts:EOTF="γ2.4" | EOTF APPLIED TO SUBTITLE DATA IS GAMMA 2.4. |
| | | | tts:EOTF="HDR" | EOTF APPLIED TO SUBTITLE DATA IS HDR COMPATIBLE EOTF. |
| | | | tts:EOTF="SDR" | EOTF APPLIED TO SUBTITLE DATA IS SDR COMPATIBLE EOTF. |
| (3-2) | COLOR DEPTH DESIGNATION INFORMATION (FIXED) (attribute =String) | tts:color10<br>tts:color12<br>tts:backgroundColor10<br>tts:backgroundColor12 | tts:color10 | COLOR EXPRESSION BIT VALUE OF SUBTITLE DATA IS 10-BIT DATA. |
| | | | tts:color12 | COLOR EXPRESSION BIT VALUE OF SUBTITLE DATA IS 12-BIT DATA. |
| | | | tts:backgroundColor10 | COLOR EXPRESSION BIT VALUE OF SUBTITLE DATA BACKGROUND IS 10-BIT DATA. |
| | | | tts:backgroundColor12 | COLOR EXPRESSION BIT VALUE OF SUBTITLE DATA BACKGROUND IS 12-BIT DATA. |

[Fig. 18]

| | (a) ATTRIBUTE | (b) XML DATA ATTRIBUTE SCRIPT FIELD | (c) XML DATA ATTRIBUTE SCRIPT EXAMPLE | (d) MEANING |
|---|---|---|---|---|
| (3-2) | COLOR DEPTH DESIGNATION INFORMATION (FIXED) (attribute =String) | tts:color10 | tts:color10 | COLOR EXPRESSION BIT VALUE OF SUBTITLE DATA IS 10-BIT DATA. |
| | | tts:color12 | tts:color12 | COLOR EXPRESSION BIT VALUE OF SUBTITLE DATA IS 12-BIT DATA. |
| | | tts:background Color10 | tts:backgroundColor10 | COLOR EXPRESSION BIT VALUE OF SUBTITLE DATA BACKGROUND IS 10-BIT DATA. |
| | | tts:background Color12 | tts:backgroundColor12 | COLOR EXPRESSION BIT VALUE OF SUBTITLE DATA BACKGROUND IS 12-BIT DATA. |

XML DATA EXAMPLE

```
<body>
<div tts:colorspace="BT.2020" tts:EOTF="SMPTEST2084" >
        411                              412
  COLOR SPACE                  EOTF DESIGNATION
  DESIGNATION INFORMATION      INFORMATION
<p begin=>
<span tts:color10="512, 0, 0">TEXT</span>
              421                      415
       COLOR DEPTH            TEXT
       DESIGNATION INFORMATION    SUBTITLE DATA
                    +
              422
         COLOR INFORMATION
</p>
</div>
</body>
```

[Fig. 19]

| (a) ATTRIBUTE | (b) XML DATA ATTRIBUTE SCRIPT FIELD | (c) XML DATA ATTRIBUTE SCRIPT EXAMPLE | (d) MEANING |
|---|---|---|---|
| (4) UHD DEFINITION INFORMATION | ttp:UHD | ttp:UHD="HDR10" | SUBTITLE DATA IS DATA THAT EMPLOYS ELECTRO-OPTICAL TRANSFER FUNCTION (EOTF), COLOR SPACE, COLOR EXPRESSION BIT VALUE OF FOLLOWING DEFINITION. EOTF=SMPTE ST 2084 COLOR SPACE = BT.2020 COLOR EXPRESSION BIT VALUE = 10-BIT DATA |
| | | ttp:UHD="HDR12" | SUBTITLE DATA IS DATA THAT EMPLOYS ELECTRO-OPTICAL TRANSFER FUNCTION (EOTF), COLOR SPACE, COLOR EXPRESSION BIT VALUE OF FOLLOWING DEFINITION. EOTF=SMPTE ST 2084 COLOR SPACE = BT.2020 COLOR EXPRESSION BIT VALUE = 12-BIT DATA |

XML DATA EXAMPLE

```
{tt ttp:UHD="HDR10">    ← UHD DEFINITION INFORMATION 431
<body>
<div >
<p begin=>
<span tts:color10="512, 0, 0">TEXT
                    ↑              ↑
         COLOR INFORMATION    TEXT SUBTITLE
              (10 BITS) 414    DATA 415
</span>
</p>
</div>
</body>
```

[Fig. 20]
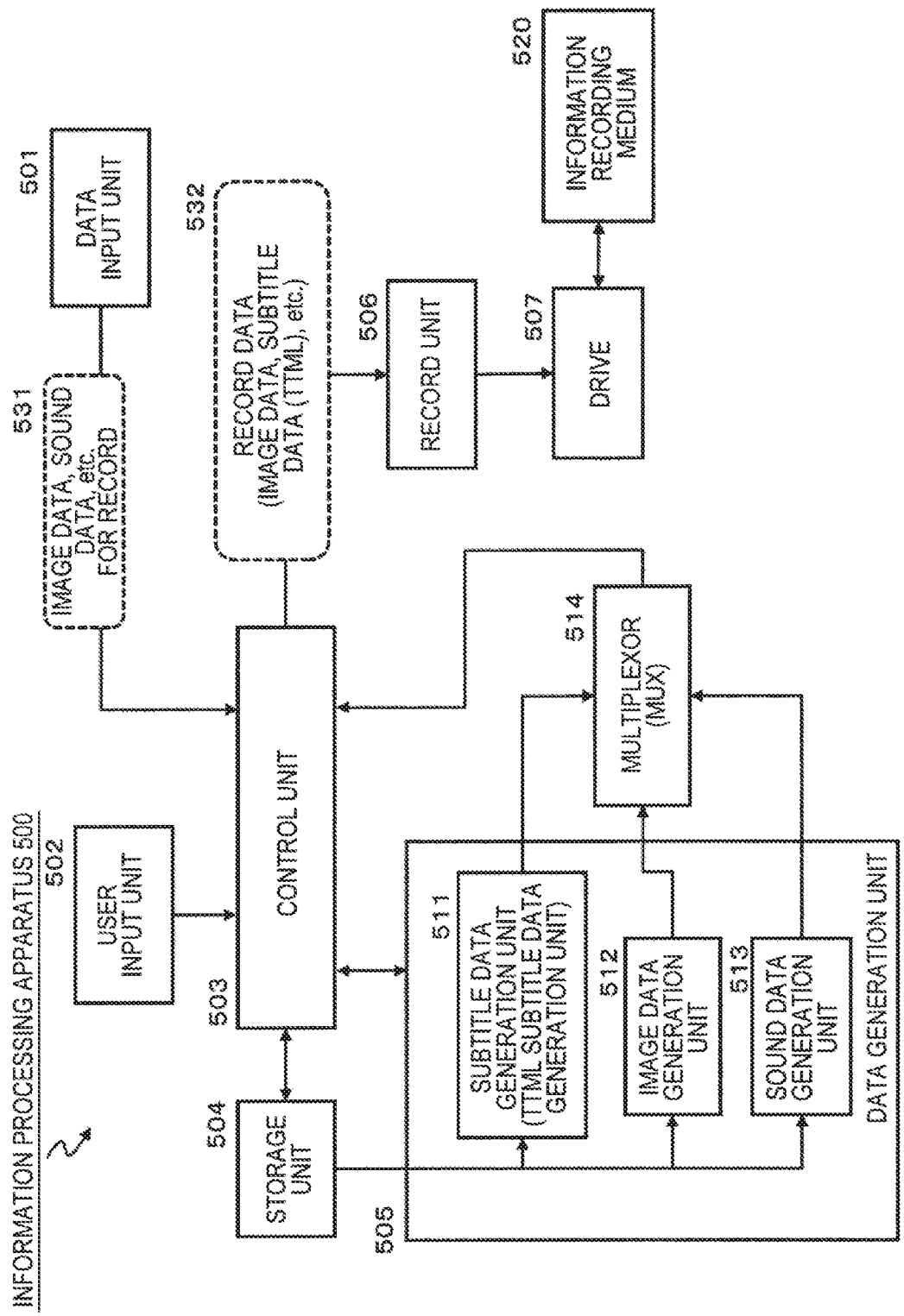

[Fig. 21]
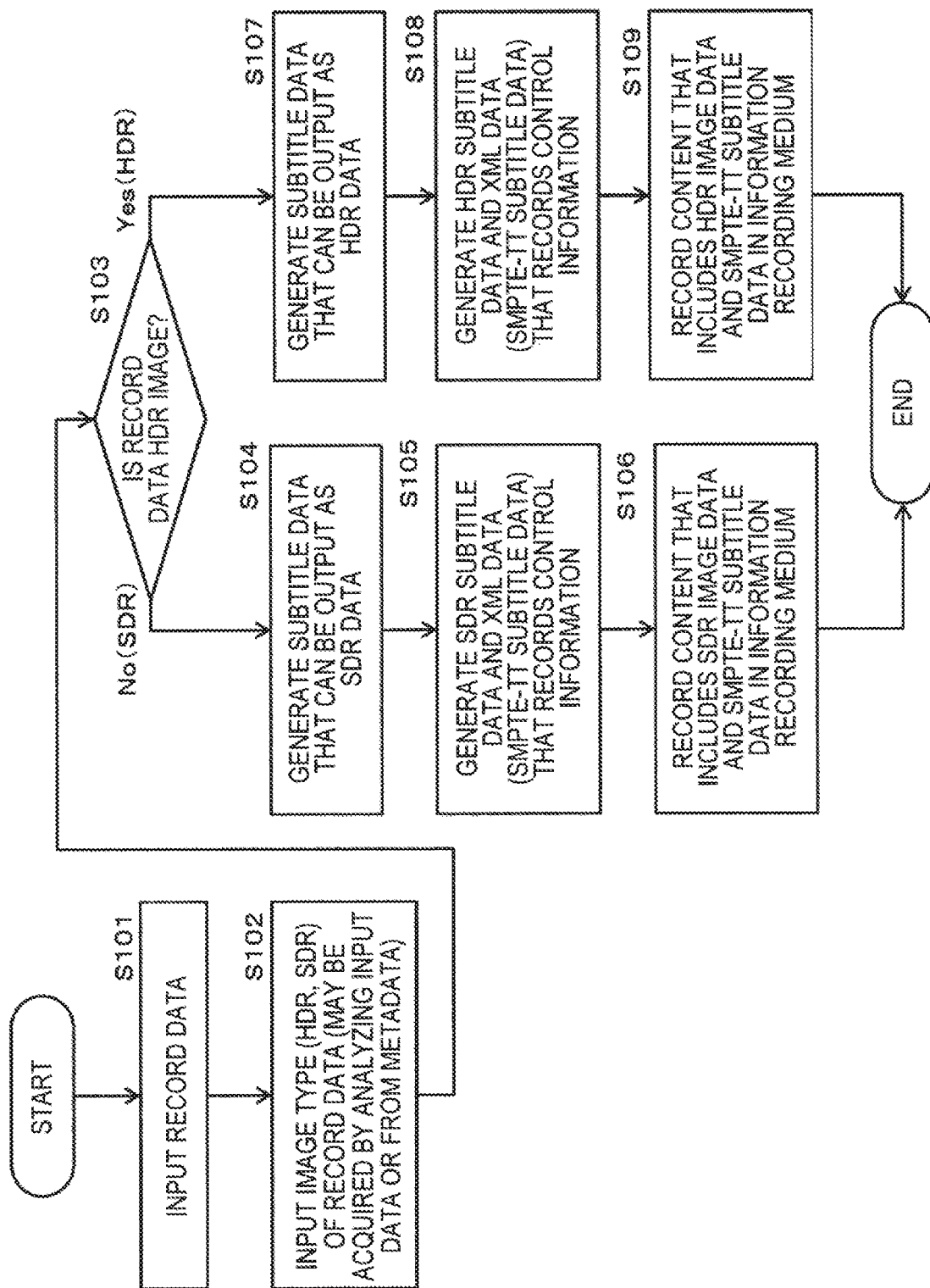

[Fig. 22]
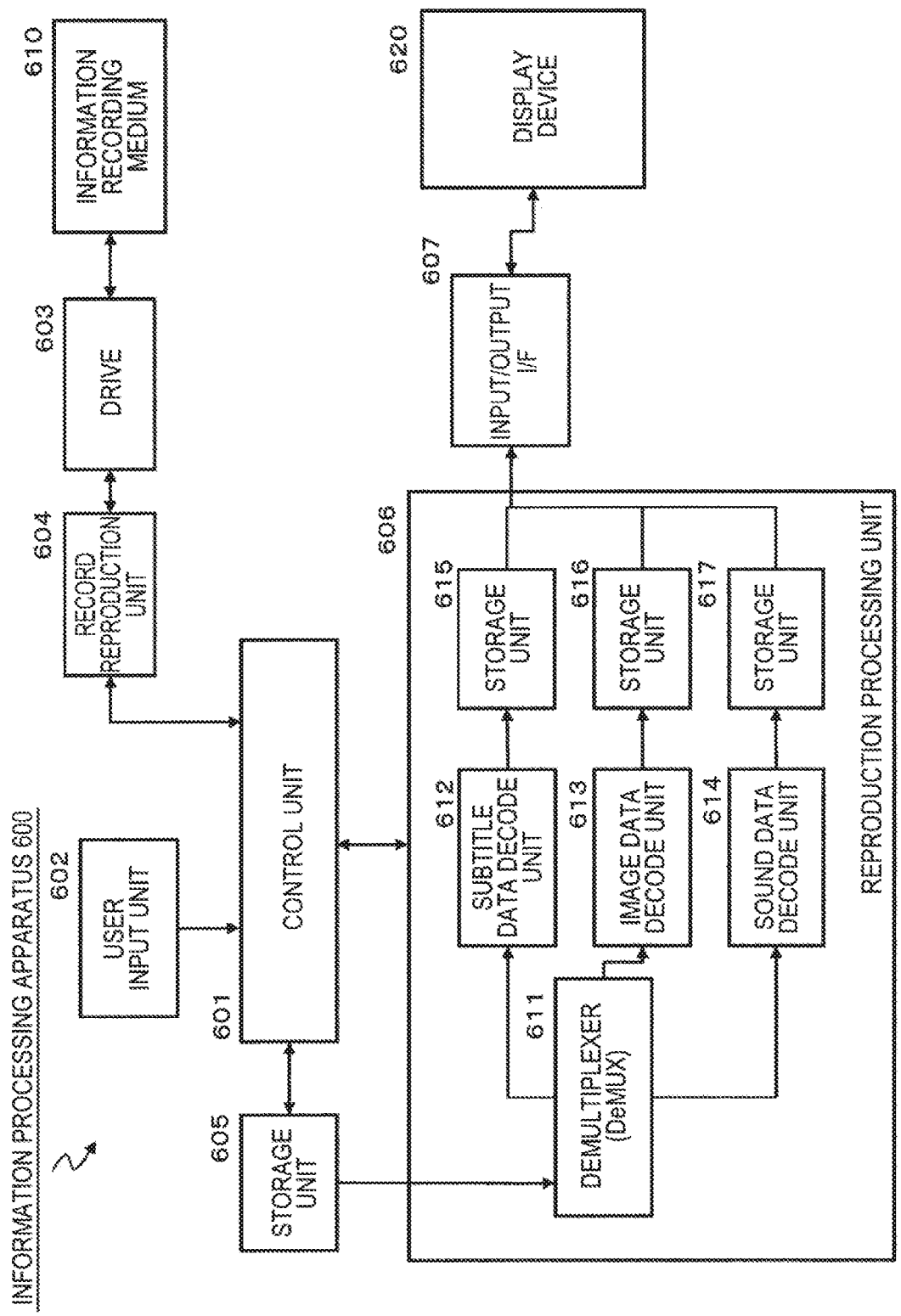

[Fig. 23]
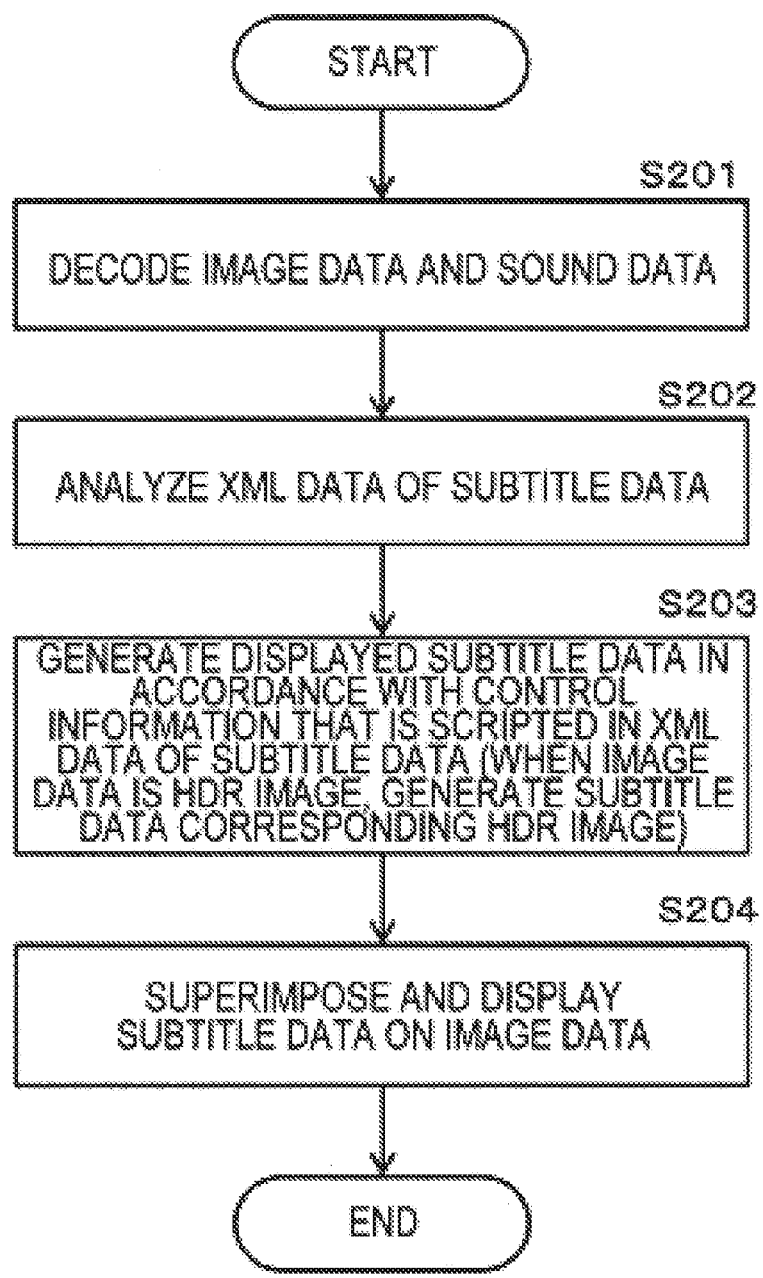

[Fig. 24]
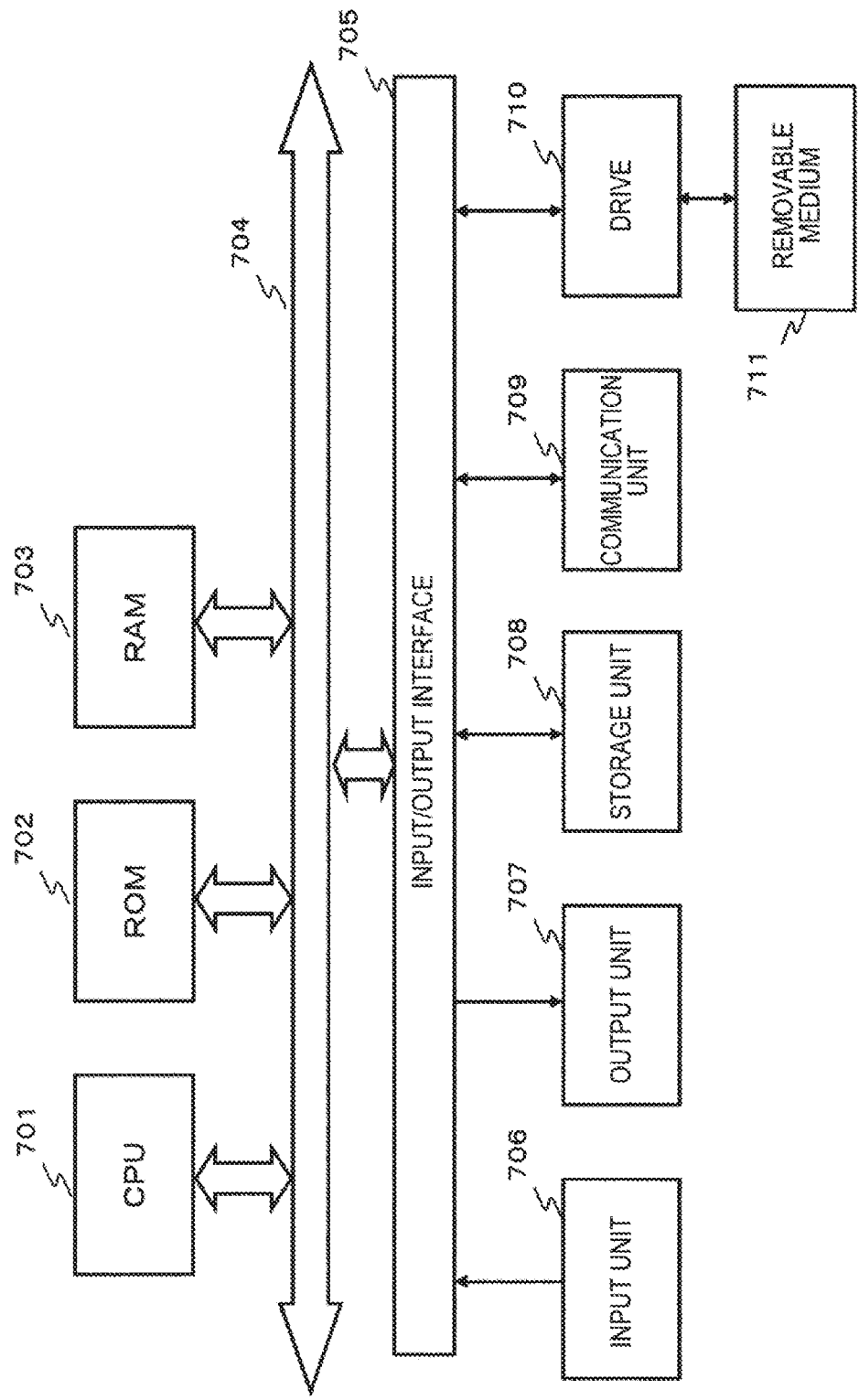

INFORMATION PROCESSING APPARATUS, INFORMATION RECORDING MEDIUM, INFORMATION PROCESSING METHOD, AND PROGRAM

CROSS REFERENCE TO RELATED APPLICATIONS

This application is a National Stage Patent Application of PCT International Patent Application No. PCT/JP2017/007465 filed on Feb. 27, 2017 under 35 U.S.C. § 371, which claims the benefit of Japanese Priority Patent Application JP 2016-053264 filed Mar. 17, 2016, the entire contents of which are incorporated herein by reference.

TECHNICAL FIELD

The present disclosure relates to an information processing apparatus, an information recording medium, an information processing method, and a program. In further detail, the present disclosure relates to an information processing apparatus, an information recording medium, an information processing method, and a program, which can output subtitle data without a feeling of strangeness, while outputting a high dynamic range (HDR) image whose outputtable color and brightness ranges are expanded more than a standard dynamic range (SDR) image of the past.

BACKGROUND ART

Many digital versatile discs (DVD) and Blu-ray (registered trademark) discs (BD) are utilized as information recording media that record various content, such as movie and music.

A BD-ROM, which is a medium that records content such as movie in advance, records data such as audio and subtitle, as well as a high definition (HD) image which is a high quality image, for example. The current BD-ROM mainly records an HD image, which is what is called a high definition television compatible 2K image in many cases, but it is envisaged that the quality of the image is enhanced in future, and the media that record an ultra high definition image (UHD) increase.

Note that representative examples of the ultra high definition image (UHD image) are high resolution images such as 4K and 8K for example, but are not limited to these high resolution images, and a high dynamic range image whose output brightness level is expanded, an image of a wide output color space, and the like are also referred to as UHD image. It is envisaged that the media that record this UHD image increase in future. Note that a data record reproduction process that utilizes the BD and the 4K image are described in Patent Literature 1 (JP 2011-023071A) or the like, for example.

It is estimated that many high dynamic range (HDR) images that expand outputtable color and brightness ranges are utilized as the ultra high definition image (UHD image), for example. Note that the image of the past whose outputtable color and brightness ranges are narrower than the HDR image is referred to as standard dynamic range (SDR) image.

The HDR image has an expanded outputtable color and an expanded outputtable brightness range as compared with the past SDR image, and can output a more natural image which is the same as an actual scene seen with an eye of a person. For example, the outputtable color range of the SDR image is the color of sRGB color space within the range of the color space of the color space specification BT.1886 or BT.709. On the other hand, the HDR image is set to output the color of BT.2020 color space which is wider than BT.1886 and BT.709.

On the other hand, subtitle data that is superimposed and displayed on content such as a movie is, for example, timed text markup language (TTML) subtitle data. The TTML subtitle data is a subtitle data format specified by the World Wide Web Consortium (W3C) which is an international standardization organization of World Wide Web (WWW) utilization technology, and is subtitle data of an extensible markup language (XML) format that is configured to script the information indicating display timing of the subtitle together with the displayed subtitle data. Note that the TTML is described in Patent Literature 2 (JP 2012-169885A) for example.

However, this TTML subtitle data is specified as the data of 8-bit expression data in the sRGB color space. That is, the TTML subtitle data is output data in the same color space as the above SDR image. Thus, there is a problem that, if the TTML subtitle data is superimposed and displayed on HDR movie content for example, the SDR subtitle data is displayed on the HDR image, and a viewer feels difference in color and brightness between the image and the subtitle, and the viewer has a feeling of strangeness.

CITATION LIST

Patent Literature

[PTL 1]
JP 2011-023071A
[PTL 2]
JP 2012-169885A

SUMMARY

Technical Problem

It is desirable to provide an information processing apparatus, an information recording medium, and an information processing method, and a program, which achieve content output with little feeling of strangeness, without generating a large difference in color shade or the like, when second content such as subtitle that differs from HDR content is superimposed and displayed on the high dynamic range (HDR) image which is first content such as movie, for example.

Solution to Problem

According to an aspect of the present disclosure, there is provided an information processing apparatus including: a data processing unit configured to execute a data reproduction process. The data processing unit includes a decode unit that decodes reproduction control information of subtitle data included in reproduction target data, and the decode unit acquires color space designation information, electro-optical transfer function (EOTF) designation information, and color depth designation information that are recorded in subtitle data reproduction control information, and generates output subtitle data in accordance with acquired information.

Further, according to a second aspect of the present disclosure, there is provided an information processing apparatus including: a data processing unit configured to execute a data reproduction process. The data processing unit includes a decode unit that decodes reproduction control information of subtitle data included in reproduction target data, and the decode unit determines whether or not subtitle data reproduction control information includes a script of ultra high definition (UHD) definition information indicating that subtitle data is UHD subtitle data corresponding to an ultra high definition image, and when the subtitle data reproduction control information includes the script of the UHD definition information, determines that subtitle data acquired in accordance with the subtitle data reproduction control information is subtitle data corresponding to an HDR image, and executes an output process of HDR subtitle data.

Further, according to a third aspect of the present disclosure, there is provided an information processing apparatus including: a data processing unit configured to execute a subtitle data generation process that includes subtitle reproduction control information. The data processing unit generates subtitle data that records a color space of subtitle data, an electro-optical transfer function (EOTF) that is applied to subtitle data output, information that can determine a color depth indicating a bit value expression form of subtitle data, as attribute information of subtitle data.

Further, according to a fourth aspect of the present disclosure, there is provided an information recording medium that records image data and subtitle data that includes subtitle reproduction control information. The subtitle reproduction control information includes a color space of subtitle data, an electro-optical transfer function (EOTF) that is applied to subtitle data output, information that can determine a color depth indicating a bit value expression form of subtitle data, as attribute information of subtitle data, and the information recording medium enables a reproduction device that executes data reproduction from an information recording medium to acquire color space designation information, electro-optical transfer function (EOTF) designation information, and color depth designation information that are recorded as subtitle data reproduction control information, and to generate output subtitle data in accordance with acquired information.

Further, according to a fifth aspect of the present disclosure, there is provided an information processing method executed in an information processing apparatus, the information processing apparatus including a data processing unit that executes a data reproduction process, the method including: decoding, by the data processing unit, reproduction control information of subtitle data included in reproduction target data; acquiring, by the data processing unit, color space designation information, electro-optical transfer function (EOTF) designation information, and color depth designation information that are recorded in subtitle data reproduction control information; and generating, by the data processing unit, output subtitle data in accordance with acquired information.

Further, according to a sixth aspect of the present disclosure, there is provided an information processing method executed in an information processing apparatus, the information processing apparatus including a data processing unit that executes a subtitle data generation process that includes subtitle reproduction control information, the method including: generating, by the data processing unit, subtitle data that records a color space of subtitle data, an electro-optical transfer function (EOTF) that is applied to subtitle data output, and information that can determine a color depth indicating a bit value expression form of subtitle data, as attribute information of subtitle data.

Further, according to a seventh aspect of the present disclosure, there is provided a program that causes an information processing apparatus to execute information processing, the information processing apparatus including a data processing unit that executes a data reproduction process, the program causes the data processing unit to execute: a process to decode reproduction control information of subtitle data included in reproduction target data; a process to acquire color space designation information, electro-optical transfer function (EOTF) designation information, and color depth designation information that are recorded in subtitle data reproduction control information; and a process to generate output subtitle data in accordance with acquired information.

Further, according to an eighth aspect of the present disclosure, there is provided a program that causes an information processing apparatus to execute information processing, the information processing apparatus includes a data processing unit that executes a subtitle data generation process that includes subtitle reproduction control information, the program causes the data processing unit to generate subtitle data that records a color space of subtitle data, an electro-optical transfer function (EOTF) that is applied to subtitle data output, and information that can determine a color depth indicating a bit value expression form of subtitle data, as attribute information of subtitle data.

Note that the program according to the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

The object, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

Advantageous Effects of Invention

According to the configuration of a working example of the present disclosure, the subtitle data output of the characteristics that corresponds to the HDR image is achieved. Specifically, the configuration of the working example of the present disclosure includes the decode unit that decodes the reproduction control information of the subtitle data included in the reproduction target data, and the decode unit acquires the color space designation information recorded in the subtitle data reproduction control information, the electro-optical transfer function (EOTF) designation information, and the color depth designation information, and generates the output subtitle data in accordance with the acquired information. The decode unit determines the subtitle data acquired in accordance with the subtitle data reproduction control information to be the subtitle data generated in accordance with the color space corresponding to the HDR image, when the information recorded in the subtitle data reproduction control information is the color depth, the EOTF, the color space, or the like which are applied to the HDR image, and executes the output process of the HDR subtitle data. The subtitle data output of the characteristics that corresponds to the HDR image is achieved by the present configuration. Note that the effects described in the present specification are just examples and are not limitative, and there may be additional effects.

BRIEF DESCRIPTION OF DRAWINGS

FIG. 1 is a diagram for describing a correspondence relationship of input and output (signal value—brightness) of an HDR image and an SDR image.

FIG. 2 is a diagram for describing image generation and a record process of an HDR image.

FIG. 3 is a diagram for describing a color space.

FIG. 4 is a diagram for describing an image reproduction process of an HDR image.

FIG. 5 is a diagram for describing image generation and a record process of an SDR image.

FIG. 6 is a diagram for describing an image reproduction process of an SDR image.

FIG. 7 is a diagram for describing an exemplary reproduction process of image data and subtitle data.

FIG. 8 is a diagram for describing an exemplary reproduction process of subtitle data.

FIG. 9 is a diagram for describing an example of SMPTE-TT subtitle data.

FIG. 10 is a diagram for describing an example of SMPTE-TT subtitle data.

FIG. 11 is a diagram for describing an exemplary superimposition display process of image data and subtitle data.

FIG. 12 is a diagram for describing an exemplary process that applies an information processing apparatus.

FIG. 13 is a diagram for describing a configuration and a process of an information processing apparatus.

FIG. 14 is a diagram for describing an example of information that is recorded in subtitle data.

FIG. 15 is a diagram for describing an example of XML data that is applied to subtitle data display.

FIG. 16 is a diagram for describing an example of information that is recorded in subtitle data and XML data that is applied to subtitle data display.

FIG. 17 is a diagram for describing an example of information that is recorded in subtitle data.

FIG. 18 is a diagram for describing an example of information that is recorded in subtitle data and XML data that is applied to subtitle data display.

FIG. 19 is a diagram for describing an example of information that is recorded in subtitle data and XML data that is applied to subtitle data display.

FIG. 20 is a diagram for describing a configuration and a process of an information processing apparatus.

FIG. 21 is a diagram illustrating a flowchart for describing a process executed by an information processing apparatus.

FIG. 22 is a diagram for describing a configuration and a process of an information processing apparatus.

FIG. 23 is a diagram illustrating a flowchart for describing a process executed by an information processing apparatus.

FIG. 24 is a diagram for describing an exemplary hardware configuration of an information processing apparatus.

DESCRIPTION OF EMBODIMENTS

In the following, the detail of the information processing apparatus, the information recording medium, and the information processing method, and the program of an embodiment of the present disclosure will be described with reference to drawings. Note that description will be performed in the order of below items.

1. With Regard to HDR Image and SDR Image
2. With Regard to Generation and Exemplary Reproduction Process of HDR Image, SDR Image, and Each Image Content
3. With Regard to TTML Subtitle Data
4. With Regard to Problem Point when Performing Superimposition Display Process of HDR Image Data and SDR Subtitle Data
5. With Regard to Configuration that Superimposes and Displays Subtitle Data Whose Brightness and Color Shade are Identical with HDR Image
    5-1. (Exemplary Subtitle Data Configuration 1) With Regard to Exemplary Subtitle Data Configuration that Records, as Control Information, Color Space Designation Information, EOTF Designation Information, and Variable Color Depth Designation Information
    5-2. (Exemplary Subtitle Data Configuration 2) With Regard to Exemplary Subtitle Data Configuration that Records, as Control Information, Color Space Designation Information, EOTF Designation information, and Fixed Color Depth Designation Information
    5-3. (Exemplary Subtitle Data Configuration 3) With Regard to Exemplary Subtitle Data Configuration that Records UHD (Ultra High Definition Image) Definition Information as Control Information
6. With Regard to Configuration and Process of Information Processing Apparatus that Executes Content Generation Process and Data Record Process
7. With Regard to Configuration and Process of Information Processing Apparatus that Executes Data Reproduction Process from Information Recording Medium
8. With Regard to Exemplary Configuration of Information Processing Apparatus
9. Conclusion of Configuration of Present Disclosure

1. With Regard to HDR Image and SDR Image

First, a high dynamic range (HDR) image whose outputtable color and brightness range are expanded, and a past standard dynamic range (SDR) image will be described.

Image data that configures content that is supplied by a broadcast station and a server or content that is stored in an information recording medium (media) is changing to a high quality image with the times. Specifically, a present 2K image is transitioning to a high resolution image which is referred to as 4K image and 8K image.

Further, utilization of the high dynamic range (HDR) image that can faithfully reproduce an image of a wide brightness range from low brightness to high brightness as compared with the present standard dynamic range (SDR) image is becoming widespread.

The HDR image is an image that has a wider expressible color and a wider dynamic range than the SDR image and can express all brightness in the visible range, and can support the dynamic range and the color gamut that are substantially equivalent to visual perception characteristics of a person.

For example, the image that is stored in the information recording medium such as a Blu-ray (registered trademark) disc (BD) also tends to change from the past standard dynamic range (SDR) image to the high dynamic range (HDR) image sequentially.

In the following, the past standard dynamic range (SDR) image and the high dynamic range (HDR) image that expands the outputtable color and brightness range more than the SDR image will be described.

FIG. 1 is graphs illustrating a correspondence relationship between signal values of the HDR image and the SDR image and the display brightness. FIG. 1 illustrates each of the following drawings.

(A) a correspondence relationship graph between the input signal value and the output brightness value of HDR image (B) a correspondence relationship graph between the input signal value and the output brightness value of SDR image In both of (A) and (B), the horizontal axes are the input signal value. Specifically, the horizontal axes correspond to each signal value (for example, 8 to 12-bit signal value) of R, G, and B, for example. The vertical axis indicates the brightness value that is output to a display unit.

In the SDR image of (B), an output of brightness value 0 to 100 (cd/m$^2$) is obtained in relation to the input signal value (0 to approximately 1000). On the other hand, in the HDR image of (A), an output of brightness value 0 to 1000 (cd/m$^2$) is obtained in relation to the input signal value (0 to approximately 1000). As described above, the HDR image enables image output of the brightness range of approximately 10 times, as compared with the SDR image. This means that the HDR image can be output faithfully as an image close to reality, from darker to brighter. Note that the HDR compatible display device that can output the HDR image is to be used in order to output the HDR image.

The curving line illustrated in the correspondence relationship graph between the input signal value and the output brightness value of the HDR image illustrated in FIG. 1(A) is referred to as SMPTE ST 2084 curving line. This curving line is a representative characteristics curving line of the HDR image, and is a curving line that is specified as the standard of the Society of Motion Picture and Television Engineers (SMPTE). Note that the SMPTE ST 2084 curving line is also referred to as perceptual quantization (PQ) curving line.

The PQ curving line (=SMPTE ST 2084 curving line) is used in the generation of encoded data corresponding to the brightness range of the HDR image, i.e., the dynamic range of 0 to 10000 cd/m$^2$. Specifically, the dynamic range of the brightness range of the HDR image is converted in accordance with the PQ curving line (=SMPTE ST 2084 curving line) defined as the curve of quantization steps according to the eye of the person, and thereby the image signal that is set within the gradation of a predetermined bits (for example, 10 to 12 bits) can be generated.

On the other hand, the curving line illustrated in the correspondence relationship graph between the input signal value and the output brightness value of the SDR image illustrated in FIG. 1(B) is referred to as gamma 2.4 curving line. In an image output device such as a display, "input value: Vin" and "output value: Vout" are generally not in a straight line relationship, but the relationship between "input value: Vin" and "output value: Vout" is expressed by the below "exponentiation function".

Vout=Vin$^\gamma$

This exponent value γ corresponds to a gamma value. The gamma 2.4 curving line is a curving line in which the above exponent value γ=2.4, and is used in the generation of the encoded data corresponding to the brightness range of the SDR image, i.e., the dynamic range of 0 to 120 cd/m$^2$. Specifically, the dynamic range of the brightness range of the SDR image is converted in accordance with the gamma 2.4 curving line that is defined as the curve of the quantization steps according to the eye of the person, and thereby the image signal that is set within the gradation of a predetermined bits (for example, 8 to 10 bits) can be generated.

2. With Regard to Generation and Exemplary Reproduction Process of HDR Image, SDR Image, and Each Image Content Next, generation and an exemplary reproduction process of the HDR image, the SDR image, and each image content will be described. First, the generation and the exemplary reproduction process of the HDR content that includes the HDR image will be described with reference to FIG. 2 and following drawings. FIG. 2 illustrates an exemplary configuration of an information processing apparatus 100 that executes the generation process and the record process of the HDR content.

The image capturing unit 101 is equipped with a 4K camera for example, and records a color image of a wide color gamut color system based on ITU-R recommendation BT.2020. Note that the ITU-R recommendation is the standard specified in the International Telecommunication Union (ITU).

The wide color gamut color system based on the ITU-R recommendation BT.2020 will be described with reference to FIG. 3. FIG. 3 is a diagram that illustrates the color gamut output to the display unit when displaying the image content stored in the Blu-ray (registered trademark) disc (BD) on the display unit such as a television for example, and illustrates a plurality of color systems that are specified in the DCI standard color space. FIG. 3 illustrates ITU-R BT.709 color system, ITU-R BT.1886 color system, and ITU-R BT.2020 color system that enables color expression of a wider area.

The outputtable color of the SDR image is the color within the space that is specified by ITU-R BT.709 or ITU-R BT.1886 illustrated in FIG. 3. The SDR image is output as 8 to 10 bit signal values that is obtained by non-linearly converting the brightness by using an ITU-R BT.709 or ITU-R BT.1886 compliant optical-electro transfer function (OETF) for example.

On the other hand, the outputtable color of the HDR image is the color in the space specified by ITU-R BT.2020 illustrated in FIG. 3. The color outside the space that is specified by ITU-R BT.709 or ITU-R BT.1886 illustrated in FIG. 3 also can be output. The MDR image is output as 10 to 12 bit signal values that is obtained by non-linearly converting the brightness by using an ITU-R BT.2020 compliant optical-electro transfer function (OETF) for example. That is, the HDR image can output the color that is unable to be expressed by the SDR image, and can express wider color tone.

Returning to FIG. 2, the configuration and the process of the information processing apparatus 100 that executes the generation process and the record process of the HDR content will be described. The image capturing unit 101 is equipped with the 4K camera for example as described above, and records the color image of the wide color gamut color system based on ITU-R recommendation BT.2020. Thereafter, a grading and mastering unit 102 performs a grading or mastering process to the captured content, and linearly converts the code value and the brightness by using a conversion table 131 for example, and generates master content of the HDR. Further, metadata corresponding to the HDR master content, for example brightness information such as dynamic range and metadata including color information or the like, is generated.

Thereafter, the optical-electro transfer unit 103 non-linearly converts the brightness to the 10 to 12-bit code values for example by using the optical-electro transfer function (OETF) illustrated with reference number 132, and converts the optically linear brightness signal of the HDR master content to a display unit driving signal.

The SMPTE ST 2084 curving line that is described with reference to FIG. 1(A) in the above is utilized as the optical-electro transfer function (OETF). As described above, the SMPTE ST 2084 curving line is also referred to as perceptual quantization (PQ) curving line, and is used in the generation of the encoded data corresponding to the brightness range of the HDR image, i.e., the dynamic range of 0 to 10000 $cd/m^2$. The SMPTE ST 2084 curving line is a curving line that is applied to generate the image signal that is set within the gradation of a predetermined bits (for example, 10 to 12 bits) by converting the dynamic range of the brightness range of the HDR image in accordance with the PQ curving line (=SMPTE ST 2084 curving line) defined as the curve of the quantization steps according to the eye of the person.

The encoding unit 104 encodes the HDR master content and the metadata, and generates the encoded data in accordance with a predetermined data format. The generated encoded data is recorded in a record media 120 via a record unit 105.

FIG. 4 is a diagram illustrating an exemplary configuration of an information processing apparatus 150 as an image reproduction device that reads out and reproduces the HDR image data recorded in the record media 120 in accordance with a predetermined data format.

The decoding unit 151 executes a process for decoding an encoded stream that is read out from the record media 120 into a signal (display unit driving signal) that can be output to the display device, and extracts metadata.

Thereafter, an electro-optical linear transfer unit 152 converts the display unit driving signal including decoded 10-bit code values to an optically linear brightness signal for example, by using an electro-optical transfer function (EOTF) 171. For example, a dynamic range conversion process based on the brightness information scripted in the metadata is performed to the optically linear brightness signal after the EOTF conversion.

The electro-optical transfer function (EOTF) 171 that corresponds to the SMPTE ST 2084 curving line which is the HDR image compatible signal-brightness correspondence curving line that is described with reference to FIG. 1(A) in the above is used in the conversion process from the code value to the brightness signal.

Thereafter, the display signal generation unit 153 generates the display unit driving signal according to the characteristics of the display panel, by using the conversion table 172. In this process, a process that uses the metadata that is acquired from the record media 120 and the characteristics information (the outputtable dynamic range information, the color information, etc.) that is acquired from a display unit 154 is executed. The display unit 154 including a liquid crystal display panel and other components displays the content in accordance with the display unit driving signal that is generated by the display signal generation unit 153.

FIG. 5 illustrates an exemplary configuration of the information processing apparatus 100 that executes the generation process and the record process of the SDR content. The information processing apparatus 100 that executes the generation process and the record process of the SDR content has the same block configuration as the configuration of the information processing apparatus 100 that executes the generation process and the record process of the HDR content that is described with reference to FIG. 2 in the above.

Note that the image capturing unit 101 does not record the color image of the wide color gamut color system based on the ITU-R recommendation BT.2020, but records the color image of the color system based on the ITU-R recommendation BT.709 or BT.1886 that has a slightly narrower color system than BT.2020. The color system based on BT.709 or BT.1886 has the slightly narrower color system than BT.2020, as described with reference to FIG. 3 in the above.

A captured image of the image capturing unit 101 is input into the grading and mastering unit 102, and the grading or the mastering process is performed to the captured content. For example, the code value and the brightness are linearly converted by using the conversion table 181, in order to generate the master content of the SDR. Further, the metadata corresponding to the SDR master content, for example the metadata including the brightness information such as the dynamic range and the color information, is generated.

Thereafter, the optical-electro transfer unit 103 non-linearly converts the brightness to an 8 to 10-bit code value by using the optical-electro transfer function (OETF) illustrated with the reference number 182, and converts the optically linear brightness signal of the SDR master content to the display unit driving signal.

The generation and the record process of the HDR content that are described with reference to FIG. 2 in the above utilizes the SMPTE ST 2084 curving line that is described with reference to FIG. 1(A) in the above, as the optical-electro transfer function (OETF). On the other hand, in the record process of the SDR content, the gamma 2.4 curving line that is described with reference to FIG. 1(B) is utilized.

As described with reference to FIG. 1 in the above, the gamma 2.4 curving line is used in the generation of the encoded data corresponding to the brightness range of the SDR image, i.e., the dynamic range of 0 to 120 $cd/m^2$. Specifically, the image signal that is set within the gradation of a predetermined bits (for example, 8 to 10 bits) can be generated by converting the dynamic range of the brightness range of the SDR image in accordance with the gamma 2.4 curving line that is defined as the curve of the quantization steps according to the eye of the person.

The encoding unit 104 encodes the SDR master content and its metadata, and generates the encoded data in accordance with a predetermined data format. The generated encoded data is recorded in the record media 120 via the record unit 105.

FIG. 6 is a diagram illustrating an exemplary configuration of the information processing apparatus 150 as the image reproduction device that reads out and reproduces the SDR image data recorded in the record media 120 in accordance with a predetermined data format. The block configuration illustrated in this FIG. 6 also has the same block configuration as the reproduction device of the HDR image data that is described with reference to FIG. 4 in the above. Note that the electro-optical transfer function (EOTF) that utilizes in the electro-optical transfer unit 152 is replaced with an SDR image compatible electro-optical transfer function (EOTF) 191.

The decoding unit 151 executes a process for decoding the encoded stream that is read out from the record media 120 into a signal (display unit driving signal) that can be output to the display device, and extracts the metadata.

Thereafter, the electro-optical linear transfer unit 152 converts the display unit driving signal including the decoded 8 to 10-bit code values to an optically linear brightness signal, by using the electro-optical transfer function (EOTF) 191, for example. For example, the dynamic range conversion process based on the brightness information that is scripted in the metadata is performed to the optically linear brightness signal after the EOTF conversion.

The electro-optical transfer function (EOTF) 191 that corresponds to the gamma 2.4 curving line which is the SDR image compatible signal-brightness correspondence curving line that is described with reference to FIG. 1(B) in the above is used in the conversion process from the code value to the brightness signal.

Thereafter, the display signal generation unit 153 generates the display unit driving signal according to the characteristics of the display panel, by using the conversion table 192. In this process, a process that uses the metadata that is acquired from the record media 120 and the characteristics information (the outputtable dynamic range information, the color information, etc.) that is acquired from a display unit 154 is executed. The display unit 154 including a liquid crystal display panel and other components displays the content in accordance with the display unit driving signal that is generated by the display signal generation unit 153.

3. With Regard to TTML Subtitle Data

Next, timed text markup language (TTML) subtitle data which is subtitle data superimposed and displayed on the content such as a movie for example will be described.

As described above, the TTML subtitle data is a subtitle data format specified by the World Wide Web Consortium (W3C) which is an international standardization organization of world wide web (WWW) utilization technology, and is subtitle data of the extensible markup language (XML) format that is configured to be able to script the information indicating the display timing of the subtitle together with the displayed subtitle data.

The TTML subtitle data is mainly the below two types of subtitle data.

(1) caption type
(2) subtitle type

The caption type is the subtitle data of the assist information for a viewer who has difficulty in hearing. The subtitle type is assist information for a viewer who is unable to understand the audio language of the main content such as a movie, that is, subtitle data such as translation subtitle.

Note that CFR 47 Part 79 which is the standard established by the Federal Communications Commission of the United States of America mandates inclusion of the above subtitle data of the caption type, with respect to delivery content on the Internet or the like, and recommends SMPTE-TT as the subtitle data.

The Society of Motion Picture and Television Engineers (SMPTE) is a society of motion picture and television engineers of the United States of America, and proposes various technologies relevant to the technology such as movie and television. SMPTE Profile of the TTML (SMPTE-TT) is a subtitle display technology which adds a PNG display function which is an image display function to the TTML subtitle data.

The PNG image data as the subtitle data associated with the TTML that is scripted as the XML data can be acquired and displayed by using SMPTE-TT.

An exemplary configuration and process of the reproduction device that displays the subtitle by utilizing the SMPTE-TT will be described with reference to FIG. 7. A receiver unit 202 of the reproduction device receives main content image data 211 and SMPTE-TT subtitle data 212 via a communication network such as the Internet, for example. The receiver unit 202 inputs the main content image data 211 into an image processing unit 203, and inputs the SMPTE-TT subtitle data 212 into a subtitle processing unit 206.

The image processing unit 203 executes the decode process of the encoded data of the HDR image in the decoder 204. The decode data is stored in a storage unit 205 that has a buffer function, and is displayed sequentially on a display unit 209, under the control of output timing by a control unit 201.

On the other hand, the subtitle processing unit 206 performs analysis of the XML data that configures the SMPTE-TT subtitle data and acquires the subtitle data that is to be displayed in a decoder 207, and stores the acquired subtitle data in a storage unit 208. The subtitle data that is stored in the storage unit 208 is displayed sequentially on the display unit 209, under the control of the output timing by the control unit 201, in accordance with the subtitle display timing scripted in the XML data that is included in the SMPTE-TT subtitle data 212.

The exemplary process of the decoder 207 of the subtitle processing unit 206 will be described with reference to FIG. 8. The SMPTE-TT subtitle data 212 input into the subtitle processing unit 206 is set as the XML data that scripts the subtitle data included in the movie of 1 hour and its control information, for example.

The decoder 207 analyzes (parses) this XML data, and performs an acquisition process of the subtitle data that is to be displayed, and further analyzes the display timing information and the like. The decoder 207 sequentially acquires and decodes the subtitle data that is to be displayed, in time for the display time of each subtitle (#001, #002, #003 . . . ), and stores the subtitle data in the storage unit 208 as a buffer. Further, each subtitle is displayed on the display unit 209, at the display timing scripted in the XML data, for example, the timing of times t1, t2, t3 illustrated in FIG. 8.

A script example of the XML data that configures the SMPTE-TT subtitle data is illustrated in FIGS. 9 and 10. For example, the following script is included in the XML data that configures the SMPTE-TT subtitle data, as illustrated in FIG. 9.

(a) frame rate information
(b) picture frame information
(c) subtitle layout information
(d) subtitle display start time information
(e) subtitle display end time information
(f) displayed subtitle data (PNG) designation information (a) The frame rate information is frame rate information of the image of a subtitle display target.

(b) The picture frame information is size information (the number of vertical and horizontal pixels) of the image of the subtitle display target.

(c) The subtitle layout information is the information indicating a display layout such as a display region of the subtitle, for example.

(d) The subtitle display start time information and (e) the subtitle display end time information are the information indicating the display start time and the display end time of the subtitle.

(f) The displayed subtitle data (PNG) designation information indicates the designation information of the subtitle that is to be displayed. The subtitle data is set as the PNG data of the image data in this an example, and the designation information for acquiring one piece of subtitle PNG data is scripted.

The decoder 207 of the subtitle processing unit 206 analyzes the script of the XML data, and acquires and analyzes control information such as the display region and the display timing of the subtitle, and the subtitle is displayed sequentially on the display unit 209 in accordance with such control information.

FIG. 10 illustrates an example of the XML data that records the subtitle data of the display target as the text data in the XML data. The SMPTE-TT allows the displayed subtitle data to be set as the PNG data, but can also be recorded as the text data. The following script is included in the XML data of FIG. 10, in the same way as described with reference to FIG. 9.

(a) frame rate information
(b) picture frame information
(c) subtitle layout information
(d) subtitle display start time information
(e) subtitle display end time information
(f) displayed subtitle data (text) information The difference from the XML data illustrated in FIG. 9 is that (f) the displayed subtitle data (text) information is recorded in the XML data as text data. Note that the control information for setting a subtitle display form such as a subtitle display color can be scripted along with the text data at its prior stage. The following display color designation information is recorded before the text data, in the example illustrated in FIG. 10.

tts:color="red"

This control information is the control information that requests the subtitle text data recorded thereafter to be displayed in red.

The decoder 207 of the subtitle processing unit 206 analyzes the script of the XML data, and acquires and analyzes the control information with respect to the display form such as the display color, as well as the display region and the display timing of the subtitle, and the subtitle is displayed sequentially on the display unit 209 in accordance with the control information.

4. With Regard to Problem Point When Performing Superimposition Display Process of HDR Image Data and SDR Subtitle Data Next, a problem point when performing a superimposition display process of the HDR image data and the SDR subtitle data will be described.

FIG. 11 is an example in which the main content such as a movie is an HDR image 251, and an SDR subtitle 252 that can output the brightness and the color in the color space corresponding to the SDR image is displayed and superimposed on the HDR image 251, for example.

As described with reference to FIG. 1 and FIG. 3 in the above, the HDR data and the SDR data completely differ in the outputtable color and brightness range. For example, as described with reference to FIG. 3, the color system (BT.2020) applied to the HDR data and the color system (BT.709/BT.1886) applied to the SDR data differ in the outputtable color range. Outputting in parallel the HDR data and the SDR data, as it is, which differ completely in the output characteristics as described above, gives the viewer a feeling of strangeness based on the difference between the two images.

That is, as illustrated in FIG. 11, the main content such as a movie is the HDR image 251, and when the SDR subtitle 252 is superimposed and displayed on the HDR image 251, the image and the subtitle differ in the brightness and the color shade and give the feeling of strangeness to the viewer.

5. With Regard to Configuration That Superimposes and Displays Subtitle Data Whose Brightness and Color Shade is Identical with HDR Image As described with reference to FIG. 11, when the subtitle data that differs in the characteristics from the HDR image is superimposed and displayed on the HDR image, there is a problem that the brightness and the color shade differ, and gives the feeling of strangeness to the viewer. In the following, the configuration that solves this problem will be described.

FIG. 12 is a diagram illustrating an exemplary configuration of the information processing system that can employ the process of an embodiment of the present disclosure. An information processing apparatus 300 receives the content including the image, the audio, the subtitle data, or the like via a communication network 351 such as the Internet and broadcast wave for example, and outputs the content to a display device 370. Alternatively, the information processing apparatus 300 reads the content including the image, the audio, the subtitle data, or the like that are stored in an information recording medium 352, and executes a reproduction process, and outputs the content to the display device 370.

The information processing apparatus 300 displays the subtitle data having the brightness and the color characteristics that are the same as the HDR image, on the HDR image, in a display data generation process.

The exemplary configuration of the information processing apparatus 300 is illustrated in FIG. 13. A data input unit 302 of the information processing apparatus 300 is configured with a receiver unit that receives the content via a communication network such as the Internet, a media drive that reads the content from an information recording medium such as a disk, or the like, for example, and acquires, as inputs, the image data, the sound data, the subtitle data, and the like.

The input data of the data input unit 302 includes the image data, the sound data, and the subtitle data, and the information processing apparatus 300 executes a process to all of these input data, but only the process to the image data and the subtitle data will be described in the following.

As illustrated in the drawing, the data input unit 302 acquires, as inputs, image data 311 and subtitle data 312, and executes the process to these input data, and executes the process for displaying the subtitle data that has the brightness characteristics and the color characteristics that are the same as the HDR image, on the HDR image data, for example.

The subtitle data 312 is the aforementioned SMPTE-TT subtitle data, for example. Note that, when the image data 311 is the HDR image data, the control information that differs from the past SMPTE-TT subtitle data is recorded in the SMPTE-TT subtitle data, in order to achieve the display of the subtitle data that has the brightness characteristics and the color characteristics that are the same as the HDR image. A specific example of this control information will be described at a subsequent stage.

First, the overview of the configuration and the process of the information processing apparatus 300 illustrated in FIG. 13 will be described. The image data 311 and the subtitle data 312 that are acquired as inputs by the data input unit 302 are input into an image processing unit 303 and a subtitle processing unit 306, respectively.

The image processing unit 303 executes a decode process of the encoded data of the image in the decoder 304. The decode data is stored in a storage unit 305 that has a buffer function, and is displayed sequentially on a display unit 309, under the control of the output timing by a control unit 301. For example, the HDR image output data 321 that is generated by the decoder 304 illustrated in FIG. 13 is displayed on the display device 370.

On the other hand, the subtitle processing unit 306 performs the analysis of the XML data that configures the SMPTE-TT subtitle data in a decoder 307, and acquires the subtitle data that is to be displayed, and stores the acquired subtitle data in a storage unit 308. The subtitle data stored in the storage unit 308 is displayed sequentially on the display device 370, under the control of the output timing by the control unit 301, in accordance with the subtitle display timing scripted in the XML data. For example, HDR subtitle output data 322 that is generated by the decoder 307 illustrated in FIG. 13 is displayed on the display device 370.

As described above, when the input image data 311 is the HDR image, the subtitle data 312 that the data input unit 302 acquires as inputs from the media such as the network or the disk is configured as the subtitle data 312 that achieves the subtitle display that has the brightness characteristics and the color characteristics that are the same as the HDR image. That is, the control information that differs from the SMPTE-TT subtitle data of the past is recorded. The decoder 307 of the subtitle processing unit 306 generates the HDR subtitle output data 322, on the basis of the control information or the like, and outputs the HDR subtitle output data 322 to the display device 370.

The HDR subtitle is displayed on the HDR image in the display device 370 by this process, and the image and the subtitle are displayed together with the sense of unity of the brightness and the color shade, and the viewer can view the content without the feeling of strangeness.

A plurality of examples of the information recorded in the subtitle data 312, that is, the information that is recorded in the SMPTE-TT subtitle data to achieve the display of the subtitle data that has the brightness characteristics and the color characteristics that are the same as the HDR image will be described with reference to FIG. 14 and the following.

Below three exemplary subtitle data configurations will be described sequentially.

(Exemplary subtitle data configuration 1) the exemplary subtitle data configuration that records the color space designation information, the EOTF designation information, and the variable color depth designation information, as the control information (Exemplary subtitle data configuration 2) the exemplary subtitle data configuration that records the color space designation information, the EOTF designation information, and the fixed color depth designation information, as the control information (Exemplary subtitle data configuration 3) the exemplary subtitle data configuration that records the ultra high definition image (UHD) definition information as the control information <5-1. (Exemplary Subtitle Data Configuration 1) With Regard to Exemplary Subtitle Data Configuration that Records Color Space Designation Information, EOTF Designation Information, and Variable Color Depth Designation Information, as Control Information>

First, (exemplary subtitle data configuration 1) an exemplary subtitle data configuration that records color space designation information, the EOTF designation information, and the variable color depth designation information as the control information will be described with reference to FIG. 14 or less.

FIG. 14 illustrates the information that is recorded in the SMPTE-TT subtitle data. As illustrated in FIG. 14, each of the following data is recorded in the SMPTE-TT subtitle data.

(1) color space designation information (2) EOTF designation information (3) color depth designation information (variable)

These three types of information are recorded in the SMPTE-TT subtitle data.

"(1) color space designation information" is the information indicating the color space that is applied to the subtitle data that is displayed in accordance with the SMPTE-TT subtitle data in which this "(1) color space designation information" is recorded. The script attribute of "(1) color space designation information" is string, and the color space designation information is scripted as the string.

As illustrated in the field of FIG. 14 (1) (b), the attribute script field of "(1) color space designation information" that is set to the XML data that configures SMPTE-TT is the next field.

tts: colorSpace

Also, a specific script example of "(1) color space designation information" and its meaning are the settings illustrated in (c) and (d) of FIG. 14 (1).

tts:colorSpace="BT.2020"

The script of this color space designation information means that the subtitle data displayed in accordance with this color space designation information is the subtitle data generated in accordance with the color space BT.2020.

tts:colorSpace="BT.1886"

The script of this color space designation information means that the subtitle data displayed in accordance with this color space designation information is the subtitle data generated in accordance with the color space BT.1886.

tts:colorSpace="sRGB"

The script of this color space designation information means that the subtitle data displayed in accordance with this color space designation information is the subtitle data generated in accordance with the color space sRGB.

The decoder 307 of the subtitle processing unit 306 of the information processing apparatus 300 illustrated in FIG. 13 reads out the above "color space designation information", from the subtitle data 312 of the decode process target, that is, the SMPTE-TT subtitle data, and determines which type of color space is utilized to generate the subtitle data controlled by this designation information.

For example, when the "color space designation information" includes the script such as 'tts: colorSpace="BT.2020"', it is determined that the subtitle data controlled by this designation information is the subtitle data generated by utilizing the color space BT.2020 corresponding to the HDR image.

Also, when the "color space designation information" includes the script such as 'tts:colorSpace="BT.1886"', or 'tts:colorSpace="sRGB"', it is determined that the subtitle data controlled by this designation information is the subtitle data generated by utilizing the color space corresponding to the SDR image.

Next, "(2) EOTF designation information" will be described. The "(2) EOTF designation information" is the information indicating the electro-optical transfer function (EOTF) that is to be applied to the subtitle data that is displayed in accordance with the SMITE-TT subtitle data in which this "(2) EOTF designation information" is recorded.

The script attribute of "(2) EOTF designation information" is string, and the EOTF designation information is scripted as the string.

As illustrated in the field of FIG. 14 (2) (b), the attribute script field of "(2) EOTF designation information" set in the XML data that configures SMPTE-TT is the next field.

tts: EOTF

Also, a specific script example of "(2) EOTF designation information" and its meaning is the setting illustrated in (c) and (d) of FIG. 14 (2).

tts:EOTF="SMPTEST2084"

The script of this EOTF designation information means that the electro-optical transfer function (EOTF) that is to be applied to the display data generation process of the displayed subtitle data is SMPTE ST 2084.

tts:EOTF="γ2.4"

The script of this EOTF designation information means that the electro-optical transfer function (EOTF) that is to be applied to the display data generation process of the displayed subtitle data is a γ2.4 (gamma 2.4) curving line.

tts:EOTF="HDR"

The script of this EOTF designation information means that the electro-optical transfer function (EOTF) that is to be applied to the display data generation process of the displayed subtitle data is the HDR compatible EOTF.

tts:EOTF="SDR"

The script of this EOTF designation information means that the electro-optical transfer function (EOTF) that is to be applied to the display data generation process of the displayed subtitle data is the SDR compatible EOTF.

The decoder 307 of the subtitle processing unit 306 of the information processing apparatus 300 illustrated in FIG. 13 reads out the above "EOTF designation information" from the SMPTE-TT subtitle data as the subtitle data 312 of the decode process target, and determines which type of EOTF is utilized to generate the display data of the subtitle data controlled by this designation information.

For example, when the "EOTF designation information" includes the script such as 'tts:EOTF="SMPTEST2084"', or
'tts:EOTF="HDR"', it is determined that the display data is to be generated for the subtitle data controlled by this designation information, by applying the HDR image compatible SMPTE ST 2084 as the optical-electro transfer function (EOTF).

Also, when the "EOTF designation information" includes the script such as

'tts:EOTF="γ2.4"', or
'tts:EOTF="SDR"', it is determined that the display data is to be generated for the subtitle data controlled by this designation information, by applying the SDR image compatible γ2.4 (gamma 2.4) curving line as the optical-electro transfer function (EOTF).

Next, "(3) color depth designation information (variable)" will be described. The "(3) color depth designation information (variable)" is the information indicating the color depth (colorDepth) of the subtitle data that is displayed in accordance with the SMPTE-TT subtitle data in which the "(3) color depth designation information (variable)" is recorded. That is, the "(3) color depth designation information (variable)" is the information indicating the number of bits of the bit value indicating an RGB value, for example. The script attribute of the "(3) color depth designation information (variable)" is a numerical value (unit), and scripts the color depth designation information as the numerical value. Note that the meaning of (variable) means being settable to a plurality of various values, such as 12, 10, 8, as the numerical value of the number of bits indicating the color depth designation information.

As illustrated in the field of FIG. 14 (3) (b), the attribute script field of the "(3) color depth designation information (variable)" set in the XML data that configures SMPTE-TT is the next field.

tts: colorDepth

Also, a specific script example of the "(3) color depth designation information (variable)" and its meaning is the setting illustrated in (c) and (d) of FIG. 14 (3).

tts:colorDepth="12"

The script of this color depth designation information (variable) means that the bit value indicating the color depth of the subtitle data recorded in this XML data, for example the bit value indicating the RGB value or the like is data expressed with 12 bits.

tts:colorDepth="10"

The script of this color depth designation information (variable) means that the bit value indicating the color depth of the subtitle data recorded in this XML data, for example the bit value indicating the RGB value or the like is data expressed with 10 bits.

tts:colorDepth="8"

The script of this color depth designation information (variable) means that the bit value indicating the color depth of the subtitle data recorded in this XML data, for example the bit value indicating the RGB value or the like is data expressed with 8 bits.

The decoder 307 of the subtitle processing unit 306 of the information processing apparatus 300 illustrated in FIG. 13 reads out the above "color depth designation information (variable)" from the SMPTE-TT subtitle data as the subtitle data 312 of the decode process target, and determines how many bits are used to express the data of the bit value expression of the subtitle data controlled by this designation information.

A specific example in which each information that is described with reference to FIG. 14 is recorded in the XML data that configures the SMPTE-TT subtitle data will be described with reference to FIGS. 15 and 16.

FIG. 15 is an example of the XML data that configures the same SMPTE-TT subtitle data as described with reference to FIGS. 9 and 10 in the above. As described with reference to FIGS. 9 and 10 in the above, the following script is included in the XML data, for example.

(a) frame rate information
(b) picture frame information
(c) subtitle layout information
(d) subtitle display start time information
(e) subtitle display end time information
(f) displayed subtitle data (PNG) designation information or text information (a) The frame rate information is the frame rate information of the image of the subtitle display target.

(b) The picture frame information is the size information (the number of vertical and horizontal pixels) of the image of the subtitle display target.

(c) The subtitle layout information is the information indicating the display layout, such as the display region of the subtitle, for example.

(d) The subtitle display start time information and (e) the subtitle display end time information are the information indicating the display start time and the display end time of the subtitle.

(f) The displayed subtitle data (PNG) designation information or the text information indicate the designation information of the subtitle that is to be displayed, or the text information.

In the XML data illustrated in FIG. 15, the below information that is described with reference to FIG. 14 is recorded additionally.

(1) color space designation information 411
(2) EOTF designation information 412

The color space designation information 411 is the information indicating the color space that is applied to the subtitle data. The EOTF designation information 412 is the information indicating the electro-optical transfer function (EOTF) that is to be applied to the displayed subtitle data.

The decoder 307 of the subtitle processing unit 306 of the information processing apparatus 300 illustrated in FIG. 13 reads out these "color space designation information 411" and "EOTF the designation information 412" from the SMPTE-TT subtitle data as the subtitle data 312 of the decode process target, and determines which color space corresponds to the subtitle data controlled by this designation information, or which type of EOTF is to be utilized to generate the display data for the subtitle data.

Note that, in an example illustrated in FIG. 15, the record elements of the next subtitle control information:

(1) the color space designation information 411, and
(2) the EOTF designation information 412 are set to the next div element.

<div tts . . . >

In the XML data, different elements are recorded as a hierarchical configuration. For example, the below elements are recorded from the higher class element.

body
div
p
region
span

The lower class element is the element included in the higher class element, and the definition information and the attribute information that is specified in the higher class element are effective as the element and the definition information and the attribute information of the lower class element of that element.

(1) color space designation information 411
(2) EOTF designation information 412

These attribute information is the attribute information that is definable in any of next elements.

body
div
p
region
span

The XML data illustrated in FIG. 16 is an example of the XML data that records the next information that is described with reference to FIG. 15:

(1) color space designation information 411, and
(2) EOTF designation information 412,
as well as
(3) color depth designation information (variable) 413.

As described with reference to FIG. 14, the color depth designation information (variable) 413 is the information indicating how many bits are used to express the data of the bit value indicating the color depth of the subtitle data recorded in this XML data, for example the bit value indicating the RGB value or the like.

In the XML data illustrated in FIG. 16, the color depth designation information (variable) 413 is recorded as the next data.

tts:colorDepth="10"

The script of this color depth designation information (variable) means that the bit value indicating the color depth of the subtitle data recorded in this XML data, for example the bit value indicating the RGB value or the like is data expressed with 10 bits.

In the XML data illustrated in FIG. 16, the record data of color information 414 is as described below.

<span tts:color="512, 0, 0">

This is the bit value (the value of the RGB) indicating the color information of text subtitle data 415 recorded after this. This means that the RGB value indicating this color information is each expressed as 10-bit data, that is, bit data of 0 to 512.

tts:colorDepth="10"
color="512, 0, 0"

It is confirmed that each bit value of the RGB indicating the expressed color of the subtitle data is the 10-bit data, and the below setting, from these data.

R=512,
G=0,
B=0.

That is, it is confirmed that the textsubtitle data 415 is to be output in red (R).

<5-2. With Regard to (Exemplary Subtitle Data Configuration 2) Exemplary Subtitle Data Configuration that Records Color Space Designation Information, EOTF Designation Information, and Fixed Color Depth Designation Information, as Control Information>

Next, (exemplary subtitle data configuration 2) the exemplary subtitle data configuration that records color space designation information, the EOTF designation information, and the fixed color depth designation information as the control information will be described with reference to FIG. 17 and following drawings.

FIG. 17 illustrates the information that is recorded in the SMPTE-TT subtitle data. As illustrated in FIG. 17, each of the following data is recorded in the SMPTE-TT subtitle data, in this exemplary subtitle data configuration 2.

(1) color space designation information
(2) EOTF designation information
(3-2) color depth designation information (fixed)

These three types of information are recorded in the SMPTE-TT subtitle data.

(1) The color space designation information and (2) EOTF designation information are the same data as the (exemplary subtitle data configuration 1) that is described with reference to FIGS. 14 to 16. (1) The color space designation information is the information indicating which type of color space is used to generate the subtitle data displayed in accordance with this color space designation information. Also, (2) EOTF designation information is the information indicating the electro-optical transfer function (EOTF) that is to be applied to the displayed subtitle data.

Next, the "(3-2) color depth designation information (fixed)" will be described. The "(3-2) color depth designation information (fixed)" is the information indicating the color depth (colorDepth) of the subtitle data, in the same way as the "(3) color depth designation information (variable)" that is described with reference to FIGS. 14 to 16. Note that the "(3-2) color depth designation information (fixed)" differs from the script form of the data of the "(3) color depth designation information (variable)" that is described with reference to FIGS. 14 to 16, in that the bit numerical value indicating the color depth is a fixed script.

The "(3) color depth designation information (variable)" that is described with reference to FIGS. 14 to 16 is configured in such a manner that the value (the number of bits) of the color depth can be recorded as various numerical values, such as 8, 10, 12. That is, the "(3) color depth designation information (variable)" is the attribute script field that can record the various numerical values, as in tts:colorDepth=8, 10, 12, . . . .

On the other hand, as illustrated in the field of FIG. 17 (3-2) (b), the "(3-2) color depth designation information (fixed)" illustrated in FIG. 17 is a field that has the next script format:

tts: color10,
tts: color12,
tts: backgroundColor10, and
tts: backgroundColor12, and is a field that scripts the fixed color depth (the number of bits) information in advance.

A specific script example of "(3) color depth designation information (fixed)" and its meaning are the setting illustrated in (c) and (d) of FIG. 17 (3-2).

tts: color10

The script of this color depth designation information (fixed) means that the bit value indicating the color depth of the subtitle data recorded in this XML data, for example the bit value indicating the RGB value or the like is data expressed with 10 bits.

tts: color12

The script of this color depth designation information (fixed) means that the bit value indicating the color depth of the subtitle data recorded in this XML data, for example the bit value indicating the RGB value or the like is data expressed with 12 bits.

tts: backgroundColor10

The script of this color depth designation information (fixed) means that the bit value indicating the color depth of the background color of the subtitle data recorded in this XML data, for example the bit value indicating the RGB value or the like is data expressed with 10 bits.

tts: backgroundColor12

The script of this color depth designation information (fixed) means that the bit value indicating the color depth of the background color of the subtitle data recorded in this XML data, for example the bit value indicating the RGB value or the like is data expressed with 12 bits.

The decoder 307 of the subtitle processing unit 306 of the information processing apparatus 300 illustrated in FIG. 13 reads out the above "color depth designation information (fixed)" from the SMPTE-TT subtitle data as the subtitle data 312 of the decode process target, and determines how many bits are used to express the data of the bit value expression of the subtitle data and the subtitle background color controlled by this designation information.

A specific example in which each information that is described with reference to FIG. 17 is recorded in the XML data that configures the SMPTE-TT subtitle data will be described with reference to FIG. 18.

The XML data illustrated in FIG. 18 is an example of the XML data that records the below information that are described with reference to FIG. 17, that is, each of these information:

(1) the color space designation information 411,
(2) the EOTF designation information 412, and
(3-2) color depth designation information (fixed) 421.

The color space designation information 411 is the information indicating the color space that is applied to the subtitle data. The EOTF designation information 412 is the information indicating the electro-optical transfer function (EOTF) that is to be applied to the displayed subtitle data. The color depth designation information (fixed) 421 is the information indicating how many bits are used to express the data of the bit value indicating the color depth of the subtitle data recorded in this XML data, for example the bit value indicating the RGB value or the like, as described with reference to FIG. 17.

In the XML data illustrated in FIG. 18, the color depth designation information (fixed) 421 is recorded as the following data, together with the color information 422.

tts:color10="512, 0, 0"

The script of this color depth designation information (fixed) means that the bit value indicating the color depth of the subtitle data recorded in this XML data, for example the bit value indicating the RGB value or the like is data expressed with 10 bits.

Further, the script of "512, 0, 0" is the bit value (the value of the RGB) indicating the color information of the text subtitle data 415 recorded after this. The script of "512, 0, 0" means that the RGB value indicating this color information is each expressed as 10-bit data, that is, bit data of 0 to 512. It is confirmed that each bit value of the RGB indicating the expressed color of the subtitle data is the 10-bit data, and the below setting, from these data.

R=512,
G=0,
B=0,

That is, it is confirmed that the text subtitle data 415 is to be output in red (R).

<5-3. With Regard to Exemplary Subtitle Data Configuration that Records (Exemplary Subtitle Data Configuration 3) Ultra High Definition Image (UHD) Definition Information as Control Information>

Next, the exemplary subtitle data configuration that records the ultra high definition image (UHD) definition information as the control information will be described as the (exemplary subtitle data configuration 3).

FIG. 19 illustrates the information that is recorded in the SMPTE-TT subtitle data. As illustrated in FIG. 19, the following data is recorded in the SMPTE-TT subtitle data, in this exemplary subtitle data configuration 3.

(4) UHD Definition Information

The UHD definition information is the field that records the information of whether or not the subtitle data recorded in the SMPTE-TT subtitle data is the ultra high definition image (UHD) data. The script attribute of "(4) UHD definition information" is string, and the UHD information is scripted as the string. In the case of the UHD data, the definition data (HDR 10, HDR 12, etc.) that allows acquisition of the EOTF that is applied to the subtitle data, the color space of the subtitle data, and the color depth information of the subtitle data is recorded.

As illustrated in the field of FIG. 19 (4) (b), the attribute script field of the "(4) UHD definition information" set in the XML data that configures SMPTE-TT is the next field.

ttp: UHD

Note that the script of this attribute information means that the subtitle data that is recorded in the lower class element at or below this field is the UHD compatible subtitle, that is, the subtitle data corresponding to the HDR. On the other hand, nonexistence of script of this attribute information means that the subtitle data that is recorded in the lower class element is not the UHD compatible subtitle, but the subtitle data corresponding to the SDR.

Also, a specific script example of the "(4) UHD definition information" and its meaning are the setting illustrated in (c) and (d) of FIG. 19 (4).

ttp:UHD="HDR 10"

The script of this UHD definition information means that the subtitle data at or below this UHD definition information is the subtitle data of HDR 10 type.

Note that it is specified in advance that the subtitle data of the HDR 10 type is the subtitle data of the following setting.

The EOTF that is to be applied=SMPTE ST 2084
The color space of the subtitle data=BT.2020
The color depth (color expression bit value) of the subtitle data=10 bits ttp:UHD="HDR 12"

The script of this UHD definition information means that the subtitle data at or below this UHD definition information is the subtitle data of HDR 12 type. It is specified in advance that the subtitle data of the HDR 12 type is the subtitle data of the following setting.

The EOTF that is to be applied=SMPTE ST 2084
The color space of the subtitle data=BT.2020
The color depth (color expression bit value) of the subtitle data=12 bits The decoder 307 of the subtitle processing unit 306 of the information processing apparatus 300 illustrated in FIG. 13 reads out the above "UHD definition information" from the SMPTE-TT subtitle data as the subtitle data 312 of the decode process target, and determines the type of the subtitle data controlled by this information, and determines the EOTF, the color space, and the color depth that are specified according to the determination type.

The lower side of FIG. 19 illustrates a specific example that records this UHD definition information in the XML data that configures the SMPTE-TT subtitle data. UHD definition information 431 is recorded in the XML data illustrated in FIG. 19.

The UHD definition information recorded in the XML data illustrated in FIG. 19 is the below data.

ttp:UHD="HDR 10"

The script of this UHD definition information means that the subtitle data at or below this UHD definition information is the subtitle data of the HDR 10 type.

As described above, it is specified in advance that the subtitle data of the HDR 10 type is the subtitle data of the following setting.

The EOTF that is to be applied=SMPTE ST 2084
The color space of the subtitle data=BT.2020
The color depth (color expression bit value) of the subtitle data=10 bits The following data is further recorded as the color information 414, in the XML data illustrated in FIG. 19.

tts:color10="512, 0, 0"

The script of this color information indicates that the color depth of the subtitle data recorded in this XML data is the data of 10-bit expression, and that the RGB value is each of bit values of "512, 0, 0".

It is confirmed that each bit value of the RGB indicating the expressed color of the subtitle data is the 10-bit data, and the below setting, from these data.

R=512,
G=0,
B=0,

That is, it is confirmed that the text subtitle data 415 is to be output in red (R).

6. With Regard to Configuration and Process of Information Processing Apparatus That Executes Content Generation Process and Data Record Process Next, the configuration and the process of the information processing apparatus that executes a content generation process and a data record process will be described with reference to FIGS. 20 and 21.

FIG. 20 is a diagram illustrating the configuration of an information processing apparatus 500 that executes the content generation process and the data record process to the information recording medium. The information processing apparatus 500 records the HDR image and the SMPTE-TT subtitle data in an information recording medium 520 illustrated in FIG. 20.

A data input unit 501 acquires, as inputs, record data 531 to the information recording medium 520, that is, the record data 531 such as the image data, the sound data, and the subtitle data. The these record data 531 is the data that is produced by a content producer, and is recorded in one medium or the in a plurality of individual media for example, and is input into the information processing apparatus 500 via the media. Alternatively, the record data 531 may be configured to be input via a network or the like.

The record data 531 is stored in a storage unit 504 by the control of a control unit 503, and is thereafter input into a data generation unit 505.

The data generation unit 505 includes a subtitle data generation unit 511, an image data generation unit 512, and a sound data generation unit 513. The subtitle data generation unit 511 acquires the subtitle data from the record data 531 that is acquired by the data input unit 501 as the input and is stored in the storage unit 504, and generates the XML data that includes the reproduction control information of this subtitle data, specifically the SMPTE-TT subtitle data that is described with reference to FIGS. 14 to 19 in the above for example, and performs the encoding process. The subtitle data generation unit 511 generates the subtitle data that can express the brightness and the color equivalent to the HDR image.

An image data generation unit 512 acquires the image data from the record data 531 that is acquired by the data input unit 501 as the input and is stored in the storage unit 504, and executes the encoding process or the like in accordance with a predetermined format. A sound data generation unit 513 acquires the sound data from the record data 531 that is acquired by the data input unit 501 as the input and is stored in the storage unit 504, and executes the encoding process or the like in accordance with a predetermined format.

A multiplexor (MUX) 514 acquires, as inputs, each data of the subtitle, the image, and the audio that are generated by the subtitle data generation unit 511, the image data generation unit 512, and the sound data generation unit 513, and generates a data file that stores these data, e.g., a transport stream file (TS file). This data file is output to the information recording medium 520 via a drive 507 by a record unit 506 under the control of the control unit 503, and is recorded.

Note that the exemplary configuration that records the data that is generated by the data generation unit 505 in the information recording medium 520 is illustrated in the configuration of the diagram, but may be a configuration that outputs the generated data outside via the data output unit or a communication network such as a network, for example.

The user input unit 502 acquires, as inputs, a start request or the like of the data generation process, the record process, and the output process, for example. Further, the user input unit 502 acquires the information of the type of the data, specifically, whether the image data is the SDR image or the HDR image. The control unit 501 decides the form of the generated data on the basis of these input information. Specifically, the control unit 501 decides the setting such as the control information that is recorded in the SMPTE-TT subtitle data which is the subtitle data.

When the image is the HDR image, the subtitle data is also set to the setting that can output the brightness and the color shade that are the same as the HDR image. That is, the subtitle data generation unit 511 generates the SMPTE-TT subtitle data that is described with reference to FIGS. 14 to 19 in the above, and performs the encoding process. Note that, when the image is the SDR image, the subtitle data is also set to the setting that can output the brightness and the color shade that are the same as the SDR image.

Note that an example in which the information of the type of the record data, specifically whether the image is the SDR image or the HDR image, is input via the user input unit 502 has been described, but it may be configured such that the control unit 503 acquires these information from the metadata that is input together with the record data 531 that is input from the data input unit 501, for example. Alternatively, the control unit 503 may analyze the record data 531 that is inputs from the data input unit 501, and acquires image type information.

Next, the sequence of the data record process to the information recording medium 520 executed by the information processing apparatus 500 illustrated in FIG. 20 will be described with reference to the flowchart illustrated in FIG. 21.

The process in accordance with the flow illustrated in FIG. 21 can be executed under the control of a data processing unit (control unit) that includes a CPU that has a program execution function, in accordance with a program that is stored in the storage unit of the information processing apparatus, for example. In the following, the process of each step illustrated in the flow of FIG. 21 will be described sequentially.

(Step S101)

First, the information processing apparatus 500 acquires the record data as the input via the data input unit 501, in step S101. The image data, the sound data, the subtitle data, etc. are included in the record data. The image data is configured with the SDR image, the HDR image, or the like, for example.

(Steps S102 to S103)

Next, in step S102, the control unit 303 detects the image type information that is input from the user input unit 302. That is, the control unit 303 detects whether the image type of the record data includes the HDR or the SDR. Note that, as described above, the image type information may be acquired from the metadata, and may be acquired by analyzing the input image data. If the image data is the SDR image, the process proceeds to step S104. On the other hand, if the image data is the HDR image, the process proceeds to step S107.

(Step S104)

The process of steps S104 to S106 is the process executed to the subtitle data when the image data is the SDR image. When the image data is the SDR image, first, the subtitle data that can be output as the SDR image is generated in step S104.

(Step S105)

Next, in step S105, the SDR subtitle data and the XML data (SMPTE-TT subtitle data) that records the control information are generated.

(Step S106)

Next, in step S106, the SDR image data and the content that includes the SMPTE-TT subtitle data are recorded in the information recording medium.

By the process of the these steps S104 to S106, both of the image data and the subtitle data recorded in the information recording medium becomes the standardized data that has the brightness and the color shade corresponding to the SDR image, and when the image and the subtitle that are reproduced from the information recording medium are superimposed and displayed, the difference in the brightness and the color shade is not generated, and the viewer can view the content without the feeling of strangeness.

(Step S107)

The process of steps S107 to S109 is a process executed to the subtitle data when the image data is the HDR image. When the image data is the HDR image, first, the subtitle data that can be output as the HDR image is generated in step S107.

(Step S108)

Next, in step S108, the HDR subtitle data and the XML data (SMPTE-TT subtitle data) that records the control information are generated. This XML data is the XML data that records the control information that is described with reference to FIGS. 14 to 19 in the above.

Specifically, the XML data is the subtitle data corresponding to one of the following exemplary data configurations.

(Exemplary subtitle data configuration 1) the exemplary subtitle data configuration that records, as the control information, the color space designation information, the EOTF designation information, and the variable color depth designation information (Exemplary subtitle data configuration 2) the exemplary subtitle data configuration that records, as the control information, the color space designation information, the EOTF designation information, and the fixed color depth designation information (Exemplary subtitle data configuration 3) the exemplary subtitle data configuration that records the ultra high definition image (UHD) definition information as the control information (Step S109)

Next, in step S109, the content that includes the HDR image data and the SMPTE-TT subtitle data generated in step S107 are recorded in the information recording medium.

By the process of the these steps S107 to S109, both of the image data and the subtitle data recorded in the information recording medium becomes the standardized data that has the brightness and the color shade corresponding to the HDR image, and when the image and the subtitle that are reproduced from the information recording medium are superimposed and displayed, the difference in the brightness and the color shade is not generated, and the viewer can view the content without the feeling of strangeness.

7. With Regard to Configuration and Process of Information Processing Apparatus That Executes Data Reproduction Process from Information Recording Medium Next, the configuration and the process of the information processing apparatus that executes a data reproduction process from the information recording medium will be described with reference to FIGS. 22 and 23.

FIG. 22 is a diagram illustrating the configuration of an information processing apparatus 600 that executes the reproduction process of the data recorded in the information recording medium such as the BD. The information processing apparatus 600 reads the data recorded in an information recording medium 610 illustrated in FIG. 22, and outputs to a display device 620. Note that the display device 620 is a television or the like for example, and is a display device that includes a display, a speaker, or the like.

The information recording medium 610 is a disk for example, and records multiplexed data of image, audio, and subtitle data, and database file such as reproduction control information. The subtitle data is the SMPTE-TT subtitle data described in the above, for example.

A control unit 601 reads the record data of the information recording medium 610 via a record reproduction unit 604 and a drive 603, on the basis of an input of a reproduction instruction information from a user input unit 602, for example, and stores the record data in a storage unit 605 as a data buffer, and outputs the stored data to a reproduction processing unit 606.

Also, the control unit 601 executes the communication with the display device 620 via an input/output interface 607.

The reproduction processing unit 606 acquires the reproduction data read out from the information recording medium 610, that is, each data such as the image, the audio, and the subtitle, under the control of the control unit 601, and generates the reproduction data.

A demultiplexer (DeMUX) 611 acquires packets that include a storage file of each data such as the image, the audio, and the subtitle, and classifies the packets into packets of data types, and outputs each packet to a subtitle data decode unit 612, an image data decode unit 613, and a sound data decode unit 614, according to the data type.

The subtitle data generation unit 612 analyzes the XML data that records the control information that is described with reference to FIGS. 14 to 19 in the above, and generates the subtitle data for display. The subtitle data input by the subtitle data generation unit 612 is the subtitle data corresponding to one of the following exemplary data configurations, specifically.

(Exemplary subtitle data configuration 1) the exemplary subtitle data configuration that records, as the control information, the color space designation information, the EOTF designation information, and the variable color depth designation information (Exemplary subtitle data configuration 2) the exemplary subtitle data configuration that records, as the control information, the color space designation information, the EOTF designation information, and the fixed color depth designation information (Exemplary subtitle data configuration 3) the exemplary subtitle data configuration that records the ultra high definition image (UHD) definition information as the control information The displayed subtitle data generated by the analysis of the XML data by the subtitle data generation unit 612 is stored in a storage unit 615.

The image data decode unit 613 and the sound data decode unit 614 execute the decode process of the data that is contained in the packet, and store the decode data in the storage units 616, 617, respectively.

The subtitle data, the image data, and the sound data that are stored in the storage units 615 to 617 are output to the display device 620 via the input/output interface 607, wider the control of the control unit 601.

Next, the sequence of the data reproduction process from the information recording medium 610 executed by the information processing apparatus 600 illustrated in FIG. 22 will be described with reference to the flowchart illustrated in FIG. 23.

The process in accordance with the flow illustrated in FIG. 23 can be executed under the control of the data processing unit (the control unit) that includes the CPU that has the program execution function, in accordance with the program that is stored in the storage unit of the information processing apparatus 600, for example. In the following, the process of each step illustrated in the flow of FIG. 23 will be described sequentially.

(Step S201)

First, the information processing apparatus 600 executes the decode process of the image data and the sound data, in step S201.

This process is the process executed by the image data decode unit 613 and the sound data decode unit 614 illustrated in FIG. 22.

(Steps S202 to S203)

Next, the information processing apparatus 600 analyzes the XML data in step S202, and generates the displayed subtitle data on the basis of the analysis result in step S203. This process is the process executed by the subtitle data decode unit 612 illustrated in FIG. 22.

The subtitle data decode unit 612 analyzes the XML data that records the control information that is described with reference to FIGS. 14 to 19 in the above, and generates the subtitle data for display. The subtitle data input by the subtitle data generation unit 612 is the subtitle data corresponding to one of the following exemplary data configurations, specifically.

(Exemplary subtitle data configuration 1) the exemplary subtitle data configuration that records, as the control information, the color space designation information, the EOTF designation information, and the variable color depth designation information (Exemplary subtitle data configuration 2) the exemplary subtitle data configuration that records, as the control information, the color space designation information, the EOTF designation information, and the fixed color depth designation information (Exemplary subtitle data configuration 3) the exemplary subtitle data configuration that records the ultra high definition image (UHD) definition information as the control information In step S202, the subtitle data generation unit 612 analyzes the XML data, and generates the displayed subtitle data, and stores the displayed subtitle data in the storage unit 615. Note that, when the image data is the HDR image, the subtitle data generation unit 612 generates the HDR subtitle data that has the brightness and the color shade that are the same as the HDR image. This is enabled by the subtitle data generation process that uses the XML data that records the control information that is described with reference to FIGS. 14 to 19 in the above.

(Step S204)

Next, in step S204, the image data is output to the display device and is displayed, and the displayed subtitle data that is generated in the process of steps S202 to S203 is superimposed and displayed in the image.

In the superimposition display process of the image and the subtitle, the subtitle data becomes the subtitle data that has the brightness and the color shade corresponding to the SDR image if the display image is the SDR image, and the subtitle data becomes the subtitle data that has the brightness and the color shade corresponding to the HDR image if the display image is the HDR image. That is, both of the image data and the subtitle data become the standardized data that has the same brightness and the color shade, and when the image and the subtitle that are reproduced from the information recording medium are superimposed and displayed, the difference in the brightness and the color shade does not generate, and the viewer can view the content without the feeling of strangeness.

8. With Regard to Exemplary Configuration of Information Processing Apparatus Next, an exemplary hardware configuration of an information processing apparatus that executes a content reproduction process, a device that generates record content to an information recording medium such as a disk, a record device that records content, or an information processing apparatus that is applicable as an information recording medium production device will be described with reference to FIG. 23.

A central processing unit (CPU) 701 functions as a data processing unit that executes various processing operations according to a program stored in read-only memory (ROM) 702 or a storage unit 708. For example, processes following the sequences described in the foregoing embodiments are executed. Random access memory (RAM) 703 stores information such as programs executed by the CPU 701, and data. The CPU 701, ROM 702, and RAM 703 are interconnected by a bus 704.

The CPU 701 is connected to an input/output interface 705 via the bus 704. Connected to the input/output interface 705 are an input unit 706, which includes devices such as various switches, a keyboard, a mouse, and a microphone, and an output unit 707, which includes devices such as a display and one or more speakers. The CPU 701 executes various processes in response to commands input from the input unit 706, and outputs processing results to the output unit 707, for example.

A storage unit 708 connected to the input/output interface 705 includes a hard disk or the like, for example, and stores programs executed by the CPU 701 and various data. A communication unit 709 functions as a transceiving unit for data communication via a network such as the Internet or a local area network, additionally functions as a transceiving unit for broadcast waves, and communicates with external devices.

A drive 710 connected to the input/output interface 705 drives a removable medium 711 such as a magnetic disk, an optical disc, a magneto-optical disc, or semiconductor memory such as a memory card, and executes the recording or reading of data.

9. Conclusion of Constitution of Present Disclosure

So far, the embodiment of the present disclosure has been described in detail with reference to a specific embodiment. However, it should be noted that various variations and alternative embodiments will become apparent to those skilled in the art without departing from the scope of the present disclosure. That is, it should be noted that the present disclosure is disclosed through embodiments and is not construed in a manner limited by these embodiments. In order to determine the scope of the present disclosure, it is necessary to consider the scope of the claims.

Additionally, the present technology may also be configured as below (1) An information processing apparatus including:
a data processing unit configured to execute a data reproduction process, wherein the data processing unit includes a decode unit that decodes reproduction control information of subtitle data included in reproduction target data, and
the decode unit acquires color space designation information, electro-optical transfer function (EOTF) designation information, and color depth designation information that are recorded in subtitle data reproduction control information, and generates output subtitle data in accordance with acquired information.

(2) The information processing apparatus according to (1), wherein
when color space designation information recorded in subtitle data reproduction control information is color space designation information that is applied to a high dynamic range (HDR) image, the decode unit determines subtitle data acquired in accordance with the subtitle data reproduction control information to be subtitle data generated in accordance with a color space corresponding to an HDR image, and executes an output process of HDR subtitle data.

(3) The information processing apparatus according to (1) or (2), wherein
when color space designation information recorded in subtitle data reproduction control information is a BT.2020 color space which is color space designation information that is applied to a high dynamic range (HDR) image,
the decode unit determines subtitle data acquired in accordance with the subtitle data reproduction control information to be subtitle data generated in accordance with the BT.2020 color space which is a color space corresponding to an HDR image, and executes an output process of HDR subtitle data.

(4) The information processing apparatus according to any one of (1) to (3), wherein
when electro-optical transfer function (EOTF) designation information recorded in subtitle data reproduction control information is electro-optical transfer function (EOTF) designation information that is applied to an HDR image, the decode unit generates output subtitle data by applying an electro-optical transfer function (EOTF) for HDR, to subtitle data acquired in accordance with the subtitle data reproduction control information.

(5) The information processing apparatus according to any one of (1) to (4), wherein
when electro-optical transfer function (EOTF) designation information recorded in subtitle data reproduction control information is SMPTE ST 2084 which is electro-optical transfer function (EOTF) designation information that is applied to an HDR image, the decode unit generates output subtitle data by applying SMPTE ST 2084 which is an electro-optical transfer function (EOTF) for HDR, to subtitle data acquired in accordance with the subtitle data reproduction control information.

(6) The information processing apparatus according to any one of (1) to (5), wherein
when color depth designation information recorded in subtitle data reproduction control information is color depth designation information that is applied to an HDR image, the decode unit determines a bit value recorded corresponding to subtitle data acquired in accordance with the subtitle data reproduction control information to be a bit value corresponding to an HDR image, and executes an output process of HDR subtitle data.

(7) The information processing apparatus according to any one of (1) to (6), wherein when color depth designation information recorded in subtitle data reproduction control information is information indicating 10 bits or 12 bits which is color depth designation information that is applied to an HDR image, the decode unit determines a bit value recorded corresponding to subtitle data acquired in accordance with the subtitle data reproduction control information to be a bit value corresponding to an HDR image expressed with 10 bits or 12 bits, and executes an output process of HDR subtitle data.

(8) An information processing apparatus including:

a data processing unit configured to execute a data reproduction process, wherein the data processing unit includes a decode unit that decodes reproduction control information of subtitle data included in reproduction target data, and the decode unit determines whether or not subtitle data reproduction control information includes a script of ultra high definition (UHD) definition information indicating that subtitle data is UHD subtitle data corresponding to an ultra high definition image, and when the subtitle data reproduction control information includes the script of the UHD definition information, determines that subtitle data acquired in accordance with the subtitle data reproduction control information is subtitle data corresponding to an HDR image, and executes an output process of HDR subtitle data.

(9) The information processing apparatus according to (8), wherein the decode unit acquires high dynamic range (HDR) type information recorded as the UHD definition information, and executes an output subtitle data generation process in accordance with a color space, an electro-optical transfer function (EOTF), and a color depth that are specified in advance according to an HDR type.

(10) An information processing apparatus including:

a data processing unit configured to execute a subtitle data generation process that includes subtitle reproduction control information, wherein the data processing unit generates subtitle data that records a color space of subtitle data, an electro-optical transfer function (EOTF) that is applied to subtitle data output, information that can determine a color depth indicating a bit value expression form of subtitle data, as attribute information of subtitle data.

(11) The information processing apparatus according to (10), wherein the data processing unit generates subtitle data that records information that can distinguish whether a color space of subtitle data, an electro-optical transfer function (EOTF) that is applied to subtitle data output, and a color depth indicating a bit value expression form of subtitle data are high dynamic range (HDR) image compatible information or standard dynamic range (SDR) image compatible information.

(12) An information recording medium that records image data and subtitle data that includes subtitle reproduction control information, wherein the subtitle reproduction control information includes a color space of subtitle data, an electro-optical transfer function (EOTF) that is applied to subtitle data output, information that can determine a color depth indicating a bit value expression form of subtitle data, as attribute information of subtitle data, and the information recording medium enables a reproduction device that executes data reproduction from an information recording medium to acquire color space designation information, electro-optical transfer function (EOTF) designation information, and color depth designation information that are recorded as subtitle data reproduction control information, and to generate output subtitle data in accordance with acquired information.

(13) The information recording medium according to (12), wherein the subtitle reproduction control information is information that can distinguish whether a color space of subtitle data, an electro-optical transfer function (EOTF) that is applied to subtitle data output, and a color depth indicating a bit value expression form of subtitle data are high dynamic range (HDR) image compatible information or standard dynamic range (SDR) image compatible information.

(14) An information processing method executed in an information processing apparatus, the information processing apparatus including a data processing unit that executes a data reproduction process, the method including:

decoding, by the data processing unit, reproduction control information of subtitle data included in reproduction target data;

acquiring, by the data processing unit, color space designation information, electro-optical transfer function (EOTF) designation information, and color depth designation information that are recorded in subtitle data reproduction control information; and generating, by the data processing unit, output subtitle data in accordance with acquired information.

(15) An information processing method executed in an information processing apparatus, the information processing apparatus including a data processing unit that executes a subtitle data generation process that includes subtitle reproduction control information, the method including:

generating, by the data processing unit, subtitle data that records a color space of subtitle data, an electro-optical transfer function (EOTF) that is applied to subtitle data output, and information that can determine a color depth indicating a bit value expression form of subtitle data, as attribute information of subtitle data.

(16) A program that causes an information processing apparatus to execute information processing, the information processing apparatus including a data processing unit that executes a data reproduction process, the program causes the data processing unit to execute:

a process to decode reproduction control information of subtitle data included in reproduction target data;

a process to acquire color space designation information, electro-optical transfer function (EOTF) designation information, and color depth designation information that are recorded in subtitle data reproduction control information; and a process to generate output subtitle data in accordance with acquired information.

(17) A program that causes an information processing apparatus to execute information processing, the information processing apparatus includes a data processing unit that executes a subtitle data generation process that includes subtitle reproduction control information, the program causes the data processing unit to generate subtitle data that records a color space of subtitle data, an electro-optical transfer function (EOTF) that is applied to subtitle data output, and information that can determine a color depth indicating a bit value expression form of subtitle data, as attribute information of subtitle data.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as needed. Furthermore, the system in this specification is not limited to being a configuration that logically aggregates a plurality of devices, all of which are contained within the same housing.

INDUSTRIAL APPLICABILITY

As described above, according to the configuration of a working example of the present disclosure, the subtitle data output of the characteristics that corresponds to the HDR image is achieved. Specifically, the configuration of the working example of the present disclosure includes the decode unit that decodes the reproduction control information of the subtitle data included in the reproduction target data, and the decode unit acquires the color space designation information recorded in the subtitle data reproduction control information, the electro-optical transfer function (EOTF) designation information, and the color depth designation information, and generates the output subtitle data in accordance with the acquired information. The decode unit determines the subtitle data acquired in accordance with the subtitle data reproduction control information to be the subtitle data generated in accordance with the color space corresponding to the HDR image, when the information recorded in the subtitle data reproduction control information is the color depth, the EOTF, the color space, or the like which are applied to the HDR image, and executes the output process of the HDR subtitle data. The subtitle data output of the characteristics that corresponds to the HDR image is achieved by the present configuration.

REFERENCE SIGNS LIST 101 image capturing unit
102 grading and mastering unit
103 optical-electro transfer unit
104 encoding unit
105 record unit
120 record media
151 decoding unit
152 electro-optical transfer unit
153 display signal generation unit
154 display unit
201 control unit
202 receiver unit
203 image processing unit
204 decoder
205 storage unit
206 subtitle processing unit
207 decoder
208 storage unit
209 display unit
211 main content image data
212 SMPTE-TT subtitle data
251 HDR image
252 SDR subtitle
300 information processing apparatus
301 control unit
302 data input unit
303 image processing unit
304 decoder
305 storage unit
306 subtitle processing unit
307 decoder
308 storage unit
311 image data
312 subtitle data
321 HDR image output data
322 HDR subtitle output data
351 network
352 information recording medium
370 display device
411 color space designation information
412 EOTF designation information
413 color depth designation information
414 color information
415 text subtitle data
421 color depth designation information
422 color information
500 information processing apparatus
501 data input unit
502 user input unit
503 control unit
504 storage unit
505 data generation unit
506 record unit
507 drive
511 subtitle data generation unit
512 image data generation unit
513 sound data generation unit
514 multiplexor
520 information recording medium
600 information processing apparatus
601 control unit
602 user input unit
603 drive
604 record reproduction unit
605 reproduction processing unit
607 input/output interface
611 demultiplexer
612 subtitle data decode unit
613 image data decode unit
614 sound data decode unit
615 to 617 storage unit
620 display device
701 CPU
702 ROM
703 RAM
704 bus
705 input/output interface
706 input unit
707 output unit
708 storage unit
709 communication unit
710 drive
711 removable medium

The invention claimed is:

1. An information processing apparatus comprising:
circuitry configured to
execute a data reproduction process and a decoding of reproduction control information associated with subtitle data defined by an extensible markup language (XML) format based on timed text markup language (TTML), the subtitle data having information recorded therein including color space designation information that is scripted as a string indicating a type of color space, electro-optical transfer function (EOTF) designation information that is scripted as a string indicating a type of EOTF that is to be applied to the subtitle data, and color depth designation information that is scripted as a variably-set numerical value indicating a color depth of the subtitle data,
acquire, from the decoded reproduction control information, at least one selected from a group consisting of the color space designation information, the EOTF designation information, and the color depth designation information, and
generate output subtitle data in accordance with the information acquired from the decoded reproduction control information.

2. The information processing apparatus according to claim 1, wherein the subtitle data is one of a caption type selected from a group consisting of an assist information and a translation subtitle.

3. The information processing apparatus according to claim 1, wherein the subtitle data is defined based on Society of Motion Picture and Television Engineers of TTML (SMPTE-TT) by enhancing the TTML with a PNG display function.

4. The information processing apparatus according to claim 1, wherein
when the decoded reproduction control information includes the color space designation information and the color space designation information is applicable to a high dynamic range (HDR) image, the subtitle data is generated in accordance with a color space corresponding to the HDR image.

5. The information processing apparatus according to claim 1, wherein
when the decoded reproduction control information includes the color space designation information and the color space designation information is associated with a BT.2020 color space corresponding to a high dynamic range (HDR) image, the subtitle data is generated in accordance with the BT.2020 color space.

6. The information processing apparatus according to claim 1, wherein
when the decoded reproduction control information includes the EOTF designation information and the EOTF designation information is associated with a high dynamic range (HDR) image, the subtitle data is generated by applying an electro-optical transfer function (EOTF) for HDR.

7. The information processing apparatus according to claim 1, wherein
when the decoded reproduction control information includes the electro-optical transfer function (EOTF) designation information and the EOTF designation information is associated with SMPTE ST 2084 applicable to a high dynamic range (HDR) image, the subtitle data is generated by applying SMPTE ST 2084 which is an electro-optical transfer function (EOTF) for HDR.

8. The information processing apparatus according to claim 1, wherein
when the decoded reproduction control information includes the color depth designation information and the color depth designation information is applicable to a high dynamic range (HDR) image, a bit value recorded corresponding to the subtitle data is determined to correspond to an HDR.

9. The information processing apparatus according to claim 1, wherein
when the decoded reproduction control information includes the color depth designation information and the color depth designation information indicates 10 bits or 12 bits of information as applied to a high dynamic range (HDR) image, a bit value recorded in correspondence with the subtitle data is determined to correspond to the HDR image.

10. An information processing apparatus comprising:
circuitry configured to
execute a data reproduction process and a decoding of reproduction control information associated with subtitle data defined by an extensible markup language (XML) format based on timed text markup language (TTML), the subtitle data having information recorded therein including color space designation information that is scripted as a string indicating a type of color space, electro-optical transfer function (EOTF) designation information that is scripted as a string indicating a type of EOTF that is to be applied to the subtitle data, and color depth designation information that is scripted as a variably-set numerical value indicating a color depth of the subtitle data,
determine whether or not the reproduction control information includes a script of ultra high definition (UHD) definition information indicating that the subtitle data is UHD subtitle data corresponding to a UHD image, and when the reproduction control information includes the script of the UHD definition information, further determine that subtitle data acquired in accordance with the reproduction control information corresponds to a high dynamic range (HDR) image, and
execute an output process of HDR subtitle data.

11. The information processing apparatus according to claim 10, wherein
HDR type information recorded as the UHD definition information is acquired, and the circuitry further executes an output subtitle data generation process in accordance with at least one selected from a group consisting of the color space, the EOTF, and the color depth that are specified in advance according to an HDR type.

12. The information processing apparatus according to claim 11, wherein the subtitle data is one of a caption type selected from a group consisting of an assist information and a translation subtitle.

13. The information processing apparatus according to claim 11, wherein the subtitle data is defined based on Society of Motion Picture and Television Engineers of TTML (SMPTE-TT) by enhancing the TTML with a PNG display function.

14. An information processing apparatus comprising:
circuitry configured to
execute a subtitle data generation process based on reproduction control information associated with the subtitle data which is defined by an extensible markup language (XML) format based on timed text markup language (TTML), the subtitle data having information recorded therein including color space designation information associated with a color space of the subtitle data and scripted as a string indicating a type of the color space, electro-optical transfer function (EOTF) designation information that is scripted as a string indicating a type of EOTF that is to be applied to the subtitle data, and color depth designation information that is scripted as a variably-set numerical value indicating a color depth of the subtitle data, and
generate the subtitle data to include at least one selected from a group consisting of the color space of the subtitle data, the EOTF that is applied to the subtitle data output, and the color depth designation information that can determine a color depth indicating a bit value expression form of the subtitle data, as attribute information of the subtitle data.

15. The information processing apparatus according to claim 14, wherein
the subtitle data is generated to include information that can distinguish whether the color space of the subtitle data, the EOTF that is applied to subtitle data output, or the color depth designation information that can determine the color depth indicating the bit value expression form of the subtitle data are high dynamic range (HDR) image compatible information or standard dynamic range (SDR) image compatible information.

16. The information processing apparatus according to claim 15, wherein the subtitle data is one of a caption type selected from a group consisting of an assist information and a translation subtitle.

17. The information processing apparatus according to claim 15, wherein the subtitle data is defined based on Society of Motion Picture and Television Engineers of TTML (SMPTE-TT) by enhancing the TTML with a PNG display function.

18. A non-transitory information recording medium on which image data, subtitle data, and reproduction control information are recorded, the reproduction control information being associated with the subtitle data which is defined by an extensible markup language (XML) format based on timed text markup language (TTML), the subtitle data having information recorded therein including color space designation information associated with a color space of the subtitle data and scripted as a string indicating a type of the color space, electro-optical transfer function (EOTF) designation information that is scripted as a string indicating a type of EOTF that is to be applied to the subtitle data, and color depth designation information that is scripted as a variably-set numerical value indicating a color depth of the subtitle data, wherein
the reproduction control information includes at least one selected from a group consisting of the color space of the subtitle data, the EOTF that is applied to subtitle data output, and the color depth designation information that can determine a color depth indicating a bit value expression form of the subtitle data, as attribute information of the subtitle data, and
the information recording medium enables a reproduction device to generate output subtitle data in accordance with the acquired information.

19. The information recording medium according to claim 18, wherein
the reproduction control information is information that can distinguish whether the color space of the subtitle data, the EOTF that is applied to subtitle data output, and the color depth designation information that can determine the color depth indicating the bit value expression form of the subtitle data are high dynamic range (HDR) image compatible information or standard dynamic range (SDR) image compatible information.

* * * * *